(12) United States Patent
Futami

(10) Patent No.: US 7,657,252 B2
(45) Date of Patent: Feb. 2, 2010

(54) PORTABLE TERMINAL, RESPONSE MESSAGE TRANSMITTING METHOD AND SERVER

(75) Inventor: Toshiyuki Futami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/105,942

(22) Filed: Apr. 13, 2005

(65) Prior Publication Data

US 2005/0233766 A1 Oct. 20, 2005

(30) Foreign Application Priority Data

Apr. 14, 2004 (JP) .............. 2004-119361

(51) Int. Cl.
*H04L 12/58* (2006.01)

(52) U.S. Cl. .............. 455/412.1; 455/412.2; 455/414.1; 455/415; 455/418; 455/566; 379/88.11; 379/88.12; 379/88.13

(58) Field of Classification Search .............. 455/414.1, 455/404.1–404.2, 556.1–556.2, 557, 412.1, 455/412.2, 413, 415, 418, 550.1, 566, 466, 455/456.3, 456.4, 456.5, 456.6, 457, 3.06, 455/456.1, 456.2, 414.2; 379/88.11, 88.12, 379/88.13

See application file for complete search history.

(56) References Cited

U.S. PATENT DOCUMENTS

| 6,288,704 | B1 | 9/2001 | Flack et al. | |
|---|---|---|---|---|
| 6,522,889 | B1 * | 2/2003 | Aarnio | 455/456.5 |
| 6,693,510 | B1 * | 2/2004 | Yamaguchi | 340/7.2 |
| 6,741,864 | B2 * | 5/2004 | Wilcock et al. | 455/456.1 |
| 6,823,184 | B1 * | 11/2004 | Nelson | 455/418 |
| 6,944,464 | B2 * | 9/2005 | Muranaga | 455/456.1 |
| 6,947,396 | B1 * | 9/2005 | Salmi | 370/310 |
| 6,957,040 | B1 * | 10/2005 | Tanaka | 455/3.06 |
| 7,194,253 | B2 * | 3/2007 | Ritter et al. | 455/414.1 |
| 2001/0031633 | A1 | 10/2001 | Tuomela et al. | |

(Continued)

FOREIGN PATENT DOCUMENTS

EP 1 063 607 A1 12/2000

(Continued)

OTHER PUBLICATIONS

European Search Report, European Patent Application No. 05 00 7743, dated Dec. 22, 2005.

(Continued)

*Primary Examiner*—Charles N Appiah
*Assistant Examiner*—Olumide T Ajibade Akonai
(74) *Attorney, Agent, or Firm*—Michael Best & Friedrich LLP

(57) ABSTRACT

A portable terminal with a telephone or radio communication function, a call response message transmitting method and a server for, when the user cannot answer an incoming call, enabling the user of the portable terminal to inform the caller of his/her situation that does not allow him/her to answer the call. A portable terminal comprises a storage for storing information on different types of messages each being associated with an image in a prescribed pose or gesture and a camera section for shooting an image when a call is received. The portable terminal recognizes the pose or gesture from an image shot by the camera section, and selecting a message corresponding to the recognized pose or gesture from the storage, and transmits the selected message to a calling terminal.

14 Claims, 18 Drawing Sheets

U.S. PATENT DOCUMENTS

| | | | |
|---|---|---|---|
| 2002/0056085 A1 | 5/2002 | Fahraeus | |
| 2002/0140667 A1 | 10/2002 | Horiki | |
| 2002/0167522 A1* | 11/2002 | Miyazawa | 345/530 |
| 2002/0181671 A1 | 12/2002 | Logan | |
| 2003/0123620 A1* | 7/2003 | Matsuyama | 379/88.13 |
| 2004/0012566 A1 | 1/2004 | Bradski | |
| 2005/0032527 A1* | 2/2005 | Sheha et al. | 455/456.1 |
| 2005/0037806 A1* | 2/2005 | Na | 455/556.1 |
| 2005/0153729 A1* | 7/2005 | Logan et al. | 455/550.1 |
| 2005/0185060 A1* | 8/2005 | Neven, Sr. | 348/211.2 |
| 2006/0111143 A1* | 5/2006 | Pande et al. | 455/556.1 |

FOREIGN PATENT DOCUMENTS

| | | |
|---|---|---|
| JP | 7-311833 | 11/1995 |
| JP | 2000-32122 | 1/2000 |
| JP | 2000068882 A * | 3/2000 |
| JP | 2002-354128 | 12/2002 |
| JP | 2003-92628 | 3/2003 |
| JP | 2003-274459 | 9/2003 |
| JP | 2004-15159 | 1/2004 |
| JP | 2004-15250 | 1/2004 |
| JP | 2004-80384 | 3/2004 |
| WO | WO 01/80535 | 10/2001 |
| WO | WO 01/86920 | 11/2001 |
| WO | WO 03/003781 | 1/2003 |
| WO | WO 03/034769 | 4/2003 |

OTHER PUBLICATIONS

Partial European Search Report, European Patent Application No. 05 00 7743, dated Jul. 19, 2005.

Office Action, Chinese Patent Application No. 200510065901X, dated Nov. 9, 2007 (with English translation).

Office Action, Japanese Patent Application No. 2004-119361, dated Jul. 1, 2008 (with English translation of relevant sections.).

* cited by examiner (A)　　　　　　　　(B)

| IMAGE | MESSAGE |
|---|---|
|  | I CANNOT ANSWER THE PHONE RIGHT NOW – I AM IN A MEETING |
|  | I WILL CALL YOU BACK LATER |
|  | I CANNOT ANSWER THE PHONE RIGHT NOW – I AM IN THE TRAIN |

F I G. 10
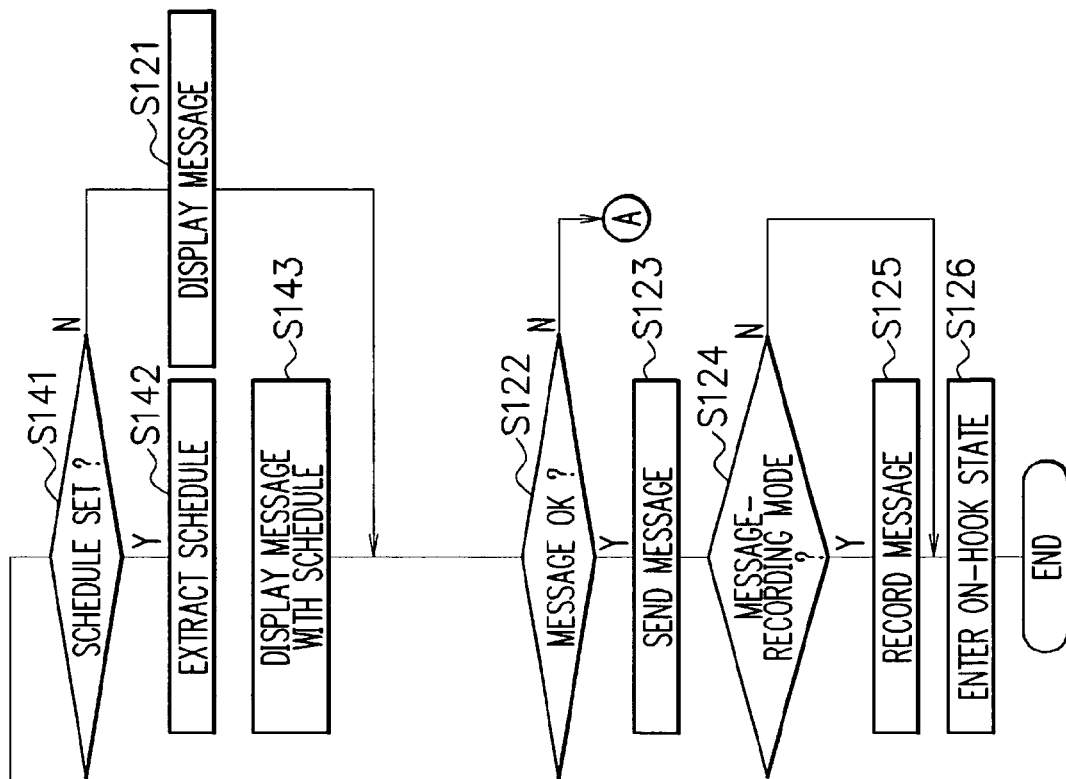
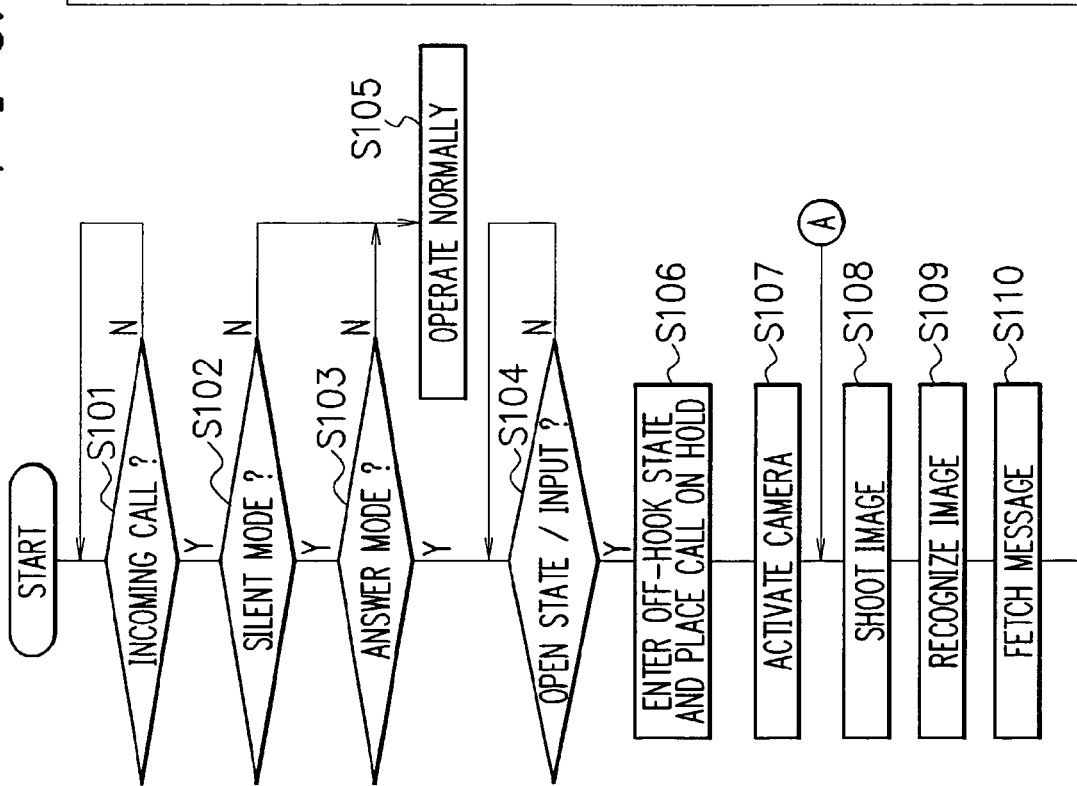

F I G. 12
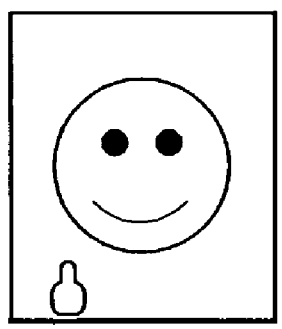 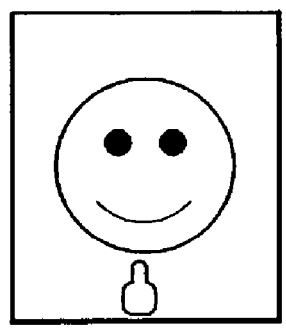 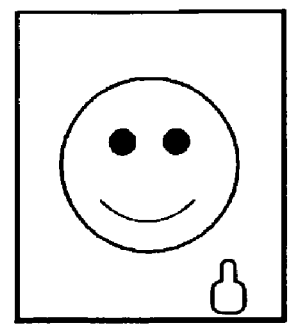
(A)
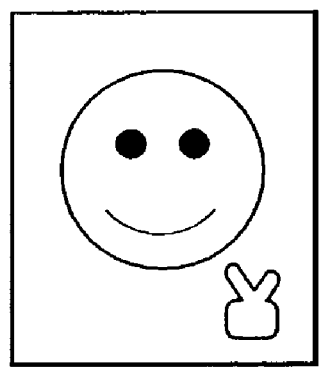
(B)

| IMAGE | MESSAGE | |
|---|---|---|
|  | A | I CANNOT ANSWER THE PHONE RIGHT NOW – I AM IN A MEETING |
| | B | I'M IN A MEETING |
|  | A | I WILL CALL YOU BACK LATER |
| | B | I'LL CALL YOU BACK |
|  | A | I CANNOT ANSWER THE PHONE RIGHT NOW – I AM IN THE TRAIN |
| | B | I'M IN THE TRAIN |

(A)

| TELEPHONE DIRECTORY | | | |
|---|---|---|---|
| NAME | TELEPHONE NUMBER | EMAIL ADDRESS | GROUP |
| XXXX | 03-0000-XXXX | --------- | B |
| 0000 | 044-△△△-XXXX | --------- | A |
| ⋮ | ⋮ | ⋮ | ⋮ |

(B)

PORTABLE TERMINAL, RESPONSE MESSAGE TRANSMITTING METHOD AND SERVER

This application claims priority of Japanese Patent Application No. 2004-119361 filed Apr. 14, 2004.

FIELD OF THE INVENTION

The present invention relates to a portable terminal such as a cellular phone and a method of transmitting a call response message applied to the portable terminal, and more particularly, to a portable terminal which sends a message to a calling terminal when receiving a call, a method of transmitting a call response message, and a server for sending a message to a calling terminal when the portable terminal receives a call.

BACKGROUND OF THE INVENTION

Almost all cellular phones have a silent (manner) mode for replacing a ring tone or melody with a vibration, etc. in public areas such as in a train. When receiving an incoming call in silent mode, a cellular phone generally activates a vibrator including a vibrating motor or the like to inform the user of the incoming call. Such environment as where a cellular phone is set in silent mode often requires the user to refrain from talking on the phone. Therefore, when receiving a call on a cellular phone in silent mode, the user will answer the call in a low voice, ignore the call or place the call on hold. With the cellular phone in auto-answer mode, a recorded or fixed voice message is sent to a calling terminal.

However, even if the user answers the call in a whisper in an environment that requires the setting of silent mode, he/she may disturb others around him/her. Besides, if the user puts the caller on hold, he/she is not always to retrieve the caller from the hold status shortly afterward, which causes the caller inconvenience. If the user ignores the call or sends a recorded voice message by an automatic answer to the calling terminal, he/she cannot inform the caller of the reason why he/she does not answer the call. Consequently, the caller may repeatedly make a call to the cellular phone in silent mode or feel distrust for the user.

In, for example, Japanese Patent Application laid open No. 2003-274459: Reference 1 (paragraphs 0037 to 0044 and FIG. 39), there has been proposed a cellular phone to solve the aforementioned problems. The cellular phone stores different types of voice messages to let the user select a voice message by a keyboard or the like and sends it as a call response message when the user cannot answer the call. As another example, in Japanese Patent Application laid open No. 2002-354128: Reference 2 (paragraphs 0007 and 0009), there has been proposed a cellular phone capable of sending a text message or an image as well as a voice message as a call response message.

According to Reference 1, however, when the user of the cellular phone cannot answer an incoming call, he/she has to press a function key in the operating section of the phone. With the use of such a user interface, the user must remember associations between respective response messages and function keys. Reference 1 describes that the user presets a response message with respect to each case as a means to reduce the trouble (refer to paragraphs 0064 to 0066). By this means, the user is forced to determine the settings for the function keys in advance, which still causes him/her trouble.

Similarly, according to Reference 2, if the user is to make the cellular phone send a response message according to his/her situation, the user is required to preset response messages or change the settings for them. In other words, the user is forced to determine the settings for the response messages in advance, which also causes him/her trouble.

SUMMARY OF THE INVENTION

It is therefore an object of the present invention to provide a portable terminal with a telephone or radio communication function, a method for transmitting a call response message and a server for, when the user cannot answer an incoming call, enabling the user of the portable terminal to inform a caller of the reason why he/she does not answer the call and his/her situation that does not allow him/her to answer the call.

In accordance with an aspect of the present invention, to achieve the object mentioned above, there is provided a portable terminal comprising a motion instruction information storage for storing information on motion instructions in association with information on forms indicating the specific forms or shapes of objects or relations between a plurality of objects such as a face and hands (e.g. gestures and poses of human body or body parts), a shooting means for shooting an image, a motion instruction information selecting means for recognizing a form from the image shot by the shooting means and selecting a motion instruction corresponding to the recognized form from the motion instruction information storage, and a controller for controlling the portable terminal according to the motion instruction selected by the motion instruction information selecting means.

In accordance with another aspect of the present invention, there is provided a portable terminal comprising a transmission instruction information storage for storing information on transmission instructions in association with form information, a shooting means for shooting an image when a call is received, a transmission instruction information selecting means for recognizing a form from the image shot by the shooting means and selecting a transmission instruction corresponding to the recognized form from the transmission instruction information storage, and a controller for transmitting prescribed information to a calling source according to the transmission instruction selected by the transmission instruction information selecting means.

In accordance with another aspect of the present invention, there is provided a portable terminal comprising a message information storage for storing information on different types of messages in association with form information, a shooting means for shooting an image when a call is received, a message information selecting means for recognizing a form from the image shot by the shooting means and selecting a message corresponding to the recognized form from the message information storage, and a message information transmitter for transmitting the message selected by the message information selecting means to a calling source.

Examples of the form information stored in the storage include form information contained in images of body parts (a face image, hand or finger images, etc.) and that contained in an image of body parts of the user of the portable terminal. Besides, there may be stored, as an image containing form information, an image of a specific place or location where the user finds it difficult to answer an incoming call by voice and talk on the phone. Further, an image containing form information may be a static image or a moving image composed of a plurality of static images.

Preferably, the portable terminal further comprises a character string information storage for storing character string information (e.g. schedule information) in association with time information and an information extracting means for extracting information indicating a location or a situation in which the user is placed at present (in a train, in a meeting, etc.) from the character string information stored in the character string information storage, and also period of duration of the situation. In this case, the message information transmitter may transmit the information extracted by the information extracting means in addition to the message selected by the message information selecting means to a calling source. Preferably, the information extracting means extracts information corresponding the time of an incoming call from the character string information stored in the character string information storage.

The message information transmitter may transmit text information or audio signals as a message. The message information transmitter may also transmit an image shot by the shooting means in addition to a message.

Preferably, the portable terminal further comprises a display, an operating section by which the user provides input, and a display control means for displaying a message on the display before the message information transmitter transmits the message to a calling source. In this case, the message information transmitter may transmit a message after the user provides confirmatory input indicating that he/she has confirmed the propriety of the message.

Preferably, the portable terminal further comprises a positional information outputting means such as a GPS receiver for outputting positional information indicating the current location of the portable terminal and a position message transmitter for, when an image shot by the shooting means is input, transmitting a message corresponding to the positional information output from the positional information outputting means.

In accordance with yet another aspect of the present invention, there is provided a portable terminal comprising a message information storage for storing information on different types of messages in association with form information, a message information selecting means for recognizing a form from an image received from an opposite portable terminal and selecting a message corresponding to the recognized form from the message information storage, and a message outputting means for outputting the message selected by the message information selecting means.

In accordance with yet another aspect of the present invention, there is provided a method of transmitting a call response message applied to a portable terminal, comprising the steps of storing beforehand information on different types of messages in association with form information in a message information storage, shooting an image by a shooting means of the portable terminal when a call is received, recognizing a form from the image shot by the shooting means, selecting a message corresponding to the recognized form from the message information storage, and transmitting the selected message to a calling source. Preferably, the response message transmitting method is applied to the condition or situation that does not allow the output of a ring tone or melody (e.g. when the portable terminal is set in silent mode).

In accordance with yet another aspect of the present invention, there is provided a server comprising a message information storage for storing information on different types of messages in association with form information, a message information selecting means for recognizing a form from an image transmitted from a portable terminal which has received an incoming call from a calling source and selecting a message corresponding to the recognized form from the message information storage, and a message information transmitter for transmitting the message selected by the message information selecting means to the calling source.

As described above, in accordance with the present invention, even when the user of a portable terminal cannot answer an incoming call, the user of the portable terminal can easily inform a caller of the reason why he/she does not answer the call and his/her situation that does not allow him/her to answer the call. Further, it is possible to give an operation instruction to a portable terminal by inputting an image, which simplifies user interfaces.

BRIEF DESCRIPTION OF THE DRAWINGS

The objects and features of the present invention will become more apparent from the consideration of the following detailed description taken in conjunction with the accompanying drawings in which:

FIG. 10 is a flowchart showing the process for sending a call response message according to the fourth embodiment of the present invention;

FIG. 12(A) is an explanatory diagram showing an example of frames of a model image as a moving image;

FIG. 12(B) is an explanatory diagram showing an example of a model image for activating answer mode;

DESCRIPTION OF THE PREFERRED EMBODIMENTS

Figure 1:
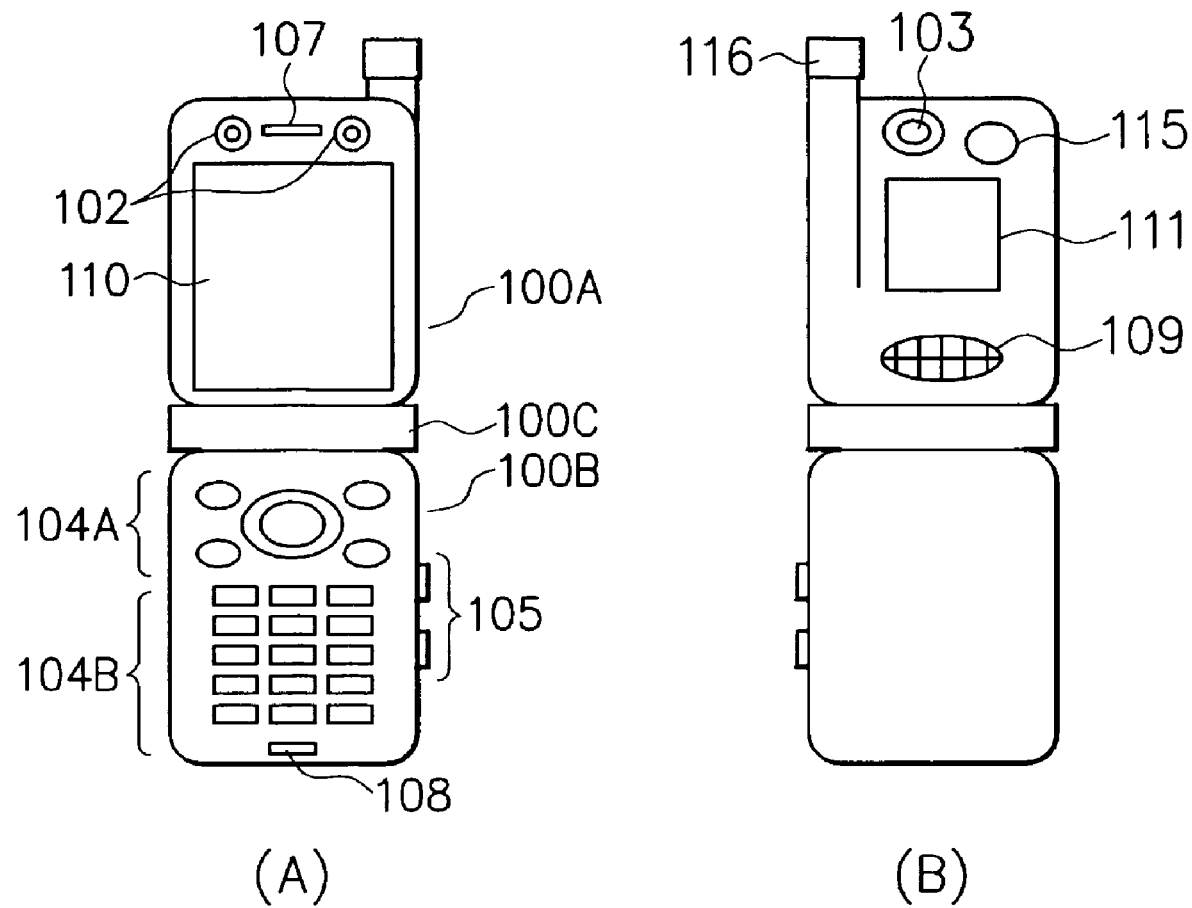
FIG. 1(A) is a front view of an example of a cellular phone according to the present invention.
FIG. 1(B) is a back view of the cellular phone.

Referring now to the drawings, a description of preferred embodiments of the present invention will be given in detail.

FIG. 1 shows a cellular phone as an example of a portable terminal to which the present invention is applied: FIG. 1(A) is a front view of the cellular phone; and FIG. 1(B) is a back view of the cellular phone. Incidentally, the cellular phone is cited merely by way of example and without limitation. The present invention is applicable to any other portable terminals such as PDA (Personal Digital Assistant) provided with a camera function and a radio communication function.

Referring to FIG. 1(A), a folding cellular phone 100 comprises an upper housing 100A, a lower hosing 100B and a hinge 100C. The upper housing 100A is foldably or hingedly connected to the lower hosing 100B to flip open or close. The upper housing 100A of the folding cellular phone 100 is provided on its inner surface with a stereo camera section 102 including two cameras for shooting a three-dimensional image, a first speaker 107 for outputting the voice of the other party during a conversation on the phone and a main display 110 for displaying an image or a text message. The lower hosing 100B is provided on its inner surface with a setting key section 104A including a scroll or enter key and function keys used for determining various settings and displaying stored information on the main display 110, a ten-key section 104B including ten keys and a microphone 108 for inputting the voice of the user during a conversation on the phone.

The stereo camera section 102 is arranged so as to be capable of shooting user's face while the user is watching the main display 110. Therefore, on the cellular phone 100 may be installed an application that implements a videophone function.

The setting key section 104A and the ten-key section 104B form a main operating section 104. The lower hosing 100B of the folding cellular phone 100 is also provided on its side with a sub operating section (side key section) 105 including keys or buttons operable when the cellular phone 100 is folded.

As can be seen in FIG. 1(B), the upper housing 100A is provided on its outer surface with a camera section 103 for shooting a two-dimensional image, a second speaker 109 for outputting a ring tone or melody signaling an incoming call, a sub display 111 for displaying an image or information such as the telephone number of a calling source, a light section 115 lit when the camera section 103 is used and an antenna 116.

Although FIG. 1 shows as an example the cellular phone 100 having the stereo camera section 102 for shooting a three-dimensional image, such means as for shooting a three-dimensional image is not essential in applying the present invention. A portable terminal to which the present invention is applied requires only a shooting means of some kind or another. While having the camera sections 102 and 103, the cellular phone 100 does not necessarily have two cameras. A portable terminal to which the present invention is applied needs only at least one shooting means. Further, FIG. 1 shows as an example the folding cellular phone, the present invention can be applied to a bar type cellular phone as well as the folding or clamshell type one. Additionally, the camera sections 102 and 103 each have an image pickup device for color photography.

Figure 2:
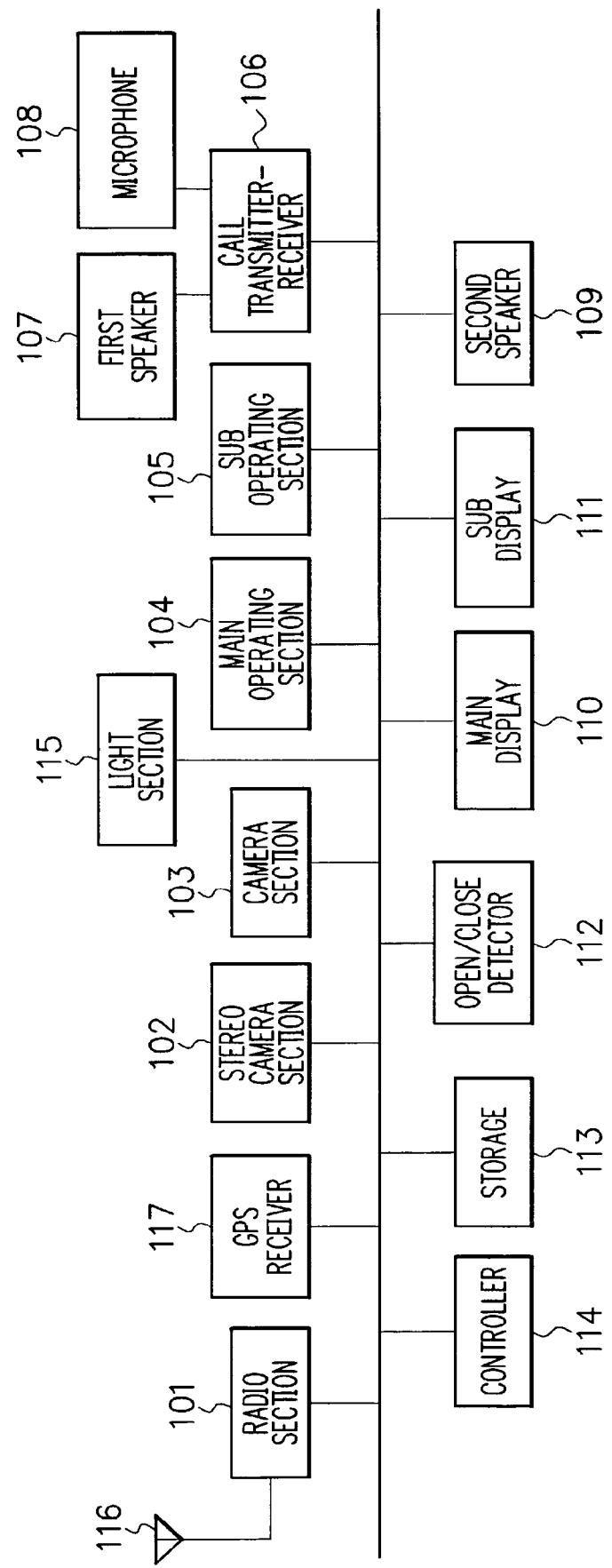
FIG. 2 is a block diagram showing an example of the construction of the cellular phone.

FIG. 2 is a block diagram showing an example of the construction of the cellular phone 100. Referring to FIG. 2, the cellular phone 100 further comprises a radio section 101, a GPS (Global Positioning System) receiver 117, a call transmitter-receiver 106, an open/close detector 112, a storage 113 and a controller 114.

The radio section 101 performs modulation, demodulation, frequency conversion and the like for audio signals and data signals. The radio section 101 transmits/receives radio signals via the antenna 116 to/from base stations (not shown). The GPS receiver 117 receives radio waves or signals from GPS satellites to calculate the location (e.g. longitude and latitude) of the cellular phone 100. Incidentally, the cellular phone 100 does not necessarily have the GPS receiver 117 in the following embodiments that require no position detection.

The controller 114 may be implemented by a CPU (Central Processing Unit), a DSP (Digital Signal Processor) or the like which operates according to a program stored in the storage 113. The GPS receiver 117 feeds the controller 114 with positional information indicating the location of the cellular phone 100. Based on input provided by the user through the main operating section 104 including the setting key section 104A and the ten-key section 104B or the sub operating section 105, the controller 114 activates the stereo camera section 102 or the camera section 103 to input an image shot and generated by the camera sections 102 and 103. The controller 114 flashes the light section (flash) 115 when activating the camera section 103. Besides, the controller 114 inputs a detection signal from the open/close detector (sensor) 112, which detects whether the cellular phone 100 is folded or unfolded: whether the upper housing 100A and the lower hosing 100B are in open or closed position.

When the user provides input by the main operating section 104 or an incoming call is received, the controller 114 displays information corresponding to the input or information stored in the storage 113 on the main display 110. When the user provides input by the sub operating section 105 or an incoming call is received, the controller 114 displays information corresponding to the input or information stored in the storage 113 on the sub display 111. In the case where the user provides input by the main operating section 104 or the sub operating section 105 to play some music on the cellular phone 100 or an incoming call is received, the controller 114 feeds the second speaker 109 with music data previously stored in the storage 113. Thus, the second speaker 109 outputs music.

The call transmitter-receiver 106 converts voice data output from the radio section 101 during a conversation on the phone or voice data stored in the storage 113 to analog signals, and feeds the first speaker 107 with the signals. The first speaker 107 outputs voice based on the audio signals from the call transmitter-receiver 106. In addition, the call transmitter-receiver 106 converts audio signals input to the microphone 108 to digital signals (voice data), and feeds the radio section 101 or the storage 113 with the signals. The storage 113 stores the voice data input from the call transmitter-receiver 106.

Figure 3:
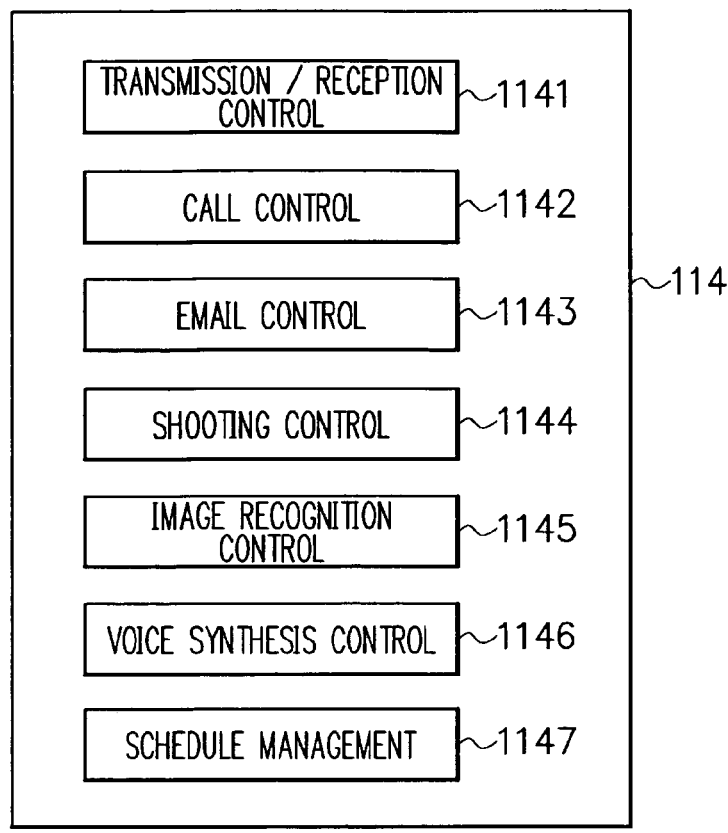
FIG. 3 is a function block diagram showing examples of functions implemented by a controller.

FIG. 3 is a function block diagram showing examples of functions implemented by the controller 114. Referring to FIG. 3, the controller 114 performs transmission/reception control 1141, call control 1142, email control 1143, shooting control 1144, image recognition control 1145, voice synthesis control 1146, and schedule management 1147.

According to the transmission/reception control 1141, for example, the radio section 101 operates to make a call in response to input for calling by the user, and also transmits a response signal after informing the controller 114 of an incoming call. According to the call control 1142, when a call has been established, as well as outputting voice data received by the radio section 101, the call transmitter-receiver 106 outputs voice data based on audio signals input through the microphone 108 to the radio section 101.

As examples of the email control 1143, the controller 114 stores email received by the radio section 101 in the storage 113, displays a screen for composing an email message on the main display 110, and transmits via the radio section 101 an email message which the user has input and requested to transmit. Besides, as examples of the shooting control 1144, the controller 114 activates the stereo camera section 102 or the camera section 103 to shoot an image in response to input for shooting by the user, stores image data of the image shot with the camera sections 102 or 103 in the storage 113, and displays the image on the main display 110 or the sub display 111. The stereo camera section 102 and the camera section 103 may shoot a moving image.

The controller 114 recognizes a prescribed image from image data stored in the storage 113 as the image recognition control 1145, and generates audio signals corresponding to text data stored in the storage 113 as the voice synthesis control 1146. Further, the controller 114 generates and updates information on user's schedule stored in the storage 113 as the schedule management 1147. Incidentally, the functions shown in FIG. 3 are given only as examples and without limitation. The controller 114 may have functions other than them. The respective functions exemplified in FIG. 3 are implemented by an application program stored in the storage 113, according to which the controller 114 operates.

Figure 4:
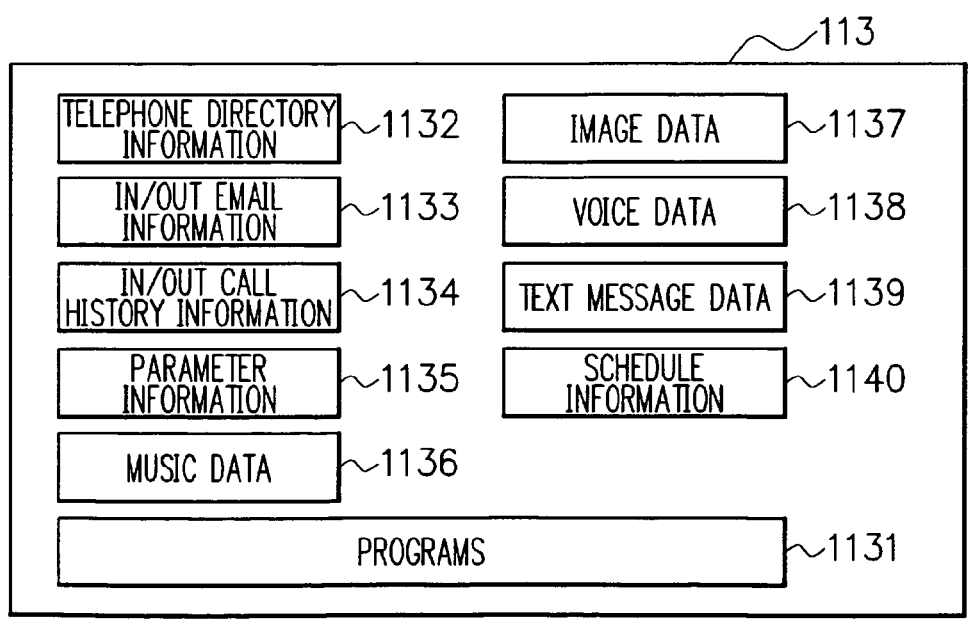
FIG. 4 is an explanatory diagram showing examples of data stored in a storage.

FIG. 4 is an explanatory diagram showing examples of data stored in the storage 113. The storage 113 may include a flash memory or the like. The storage 113 stores, in addition to programs 1131 executed by the controller 114, telephone directory information 1132, in/out email information 1133, in/out call history information 1134, parameter information 1135, music data 1136, image data 1137, voice data 1138, text message data 1139, and schedule information 1140.

The telephone directory information 1132 includes the telephone numbers, names, etc. of people the user may wish to call or contact, which have been registered by the user. The in/out email information 1133 includes data of received email as well as data of sent and unsent email. The in/out call history information 1134 includes information on the telephone numbers, names, etc. of people the user called and people who called the user in the past. The parameter information 1135 indicates the various settings of the cellular phone 100. The voice data 1138 includes voice data input by the user and that preset by the manufacturer. The text message data 1139 includes text message data input by the user and that preset by the manufacturer. Incidentally, the information and data shown in FIG. 4 are given only as examples and without limitation. The storage 113 may store more information. Besides, the storage 113 may include an external memory such as a memory card in addition to an internal memory such as a flash memory.

First Embodiment

In the following, the first embodiment of the present invention will be described. In this embodiment, a portable terminal in silent mode, which has been set to answer an incoming call (answer mode), sends a calling terminal a message corresponding to the gesture or pose of the user.

Figure 5:
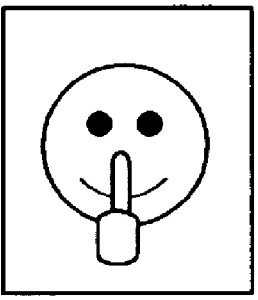
FIG. 5 is an explanatory diagram showing examples of model images each being associated with a message.
Figure 5:
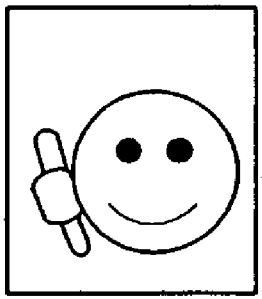
Figure 5:
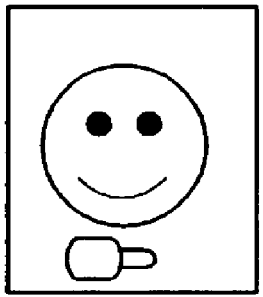

FIG. 5 is an explanatory diagram showing examples of relationships between model images and messages. The storage 113 stores model images and messages in association with one another. The model image indicates a face image with a predetermined gesture or pose, which is preset in the storage 113. The model image and corresponding message may be set in the storage 113 when the cellular phone 100 is manufactured by the cellular-phone manufacturer. For example, the manufacturer sets a prescribed image produced by using CG (Computer Graphics), etc. in the storage 113 as the model image. In such a case, a face image as the model image differs from that of the user of the cellular phone 100.

The model image may be set in the storage 113 at a shop when the user purchases the cellular phone 100. In this case, a shop assistant, etc. shoots user's face image with a gesture or a pose with a digital still camera or the like, and the face image is fed into the storage 113 of the cellular phone 100 through a prescribed interface. The user may also set the model image in the storage 113 after purchasing the cellular phone 100. In this case, an application program for inputting the model image is installed on the cellular phone 100. According to the application program, the controller 114 displays on the main display 110 an instruction as to a gesture or a pose for shooting in response to input provided by the user through the main operating section 104. The controller 114 associates a message with the image shot by the user at the instruction to store them in the storage 113.

In FIG. 5, a face image with the gesture of a finger to the lips is associated with a message that the user cannot answer the phone, a face image with the gesture of a hand whose two fingers form the shape of a handset to the ear is associated with a message that the user will call back, and a face image with the gesture of a finger pointing in a horizontal direction is associated with a message that the user is on the train. Those model images, messages and relationships between them are given by way of example only. Model images with other gestures or poses, other messages, and other combinations may be employed or added. The storage 113 also stores information on the association between each model image and a message. A table that contains the information hereinafter referred to as image conversion table. Each message associated with the model image is stored in the storage 113 as, for example, the text message data 1139.

Figure 6:
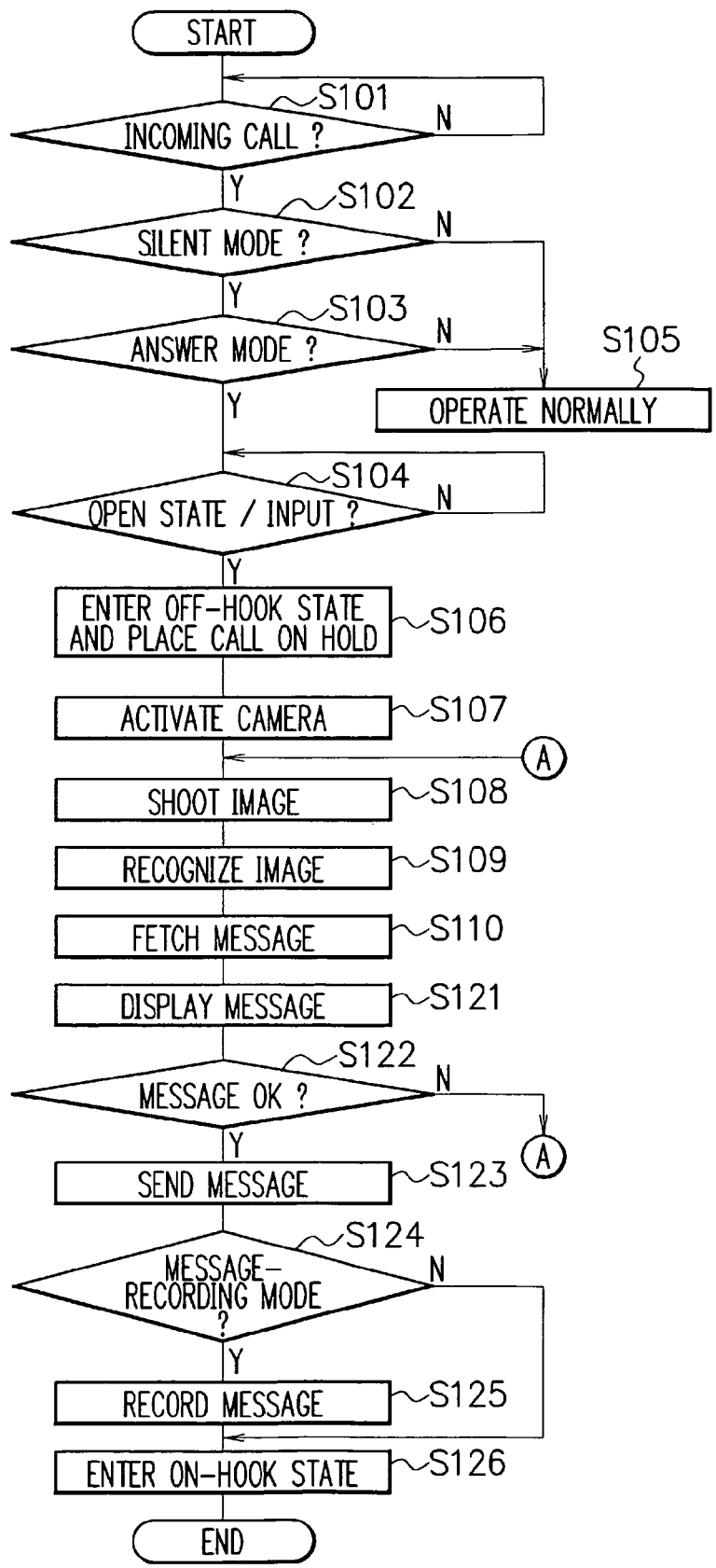
FIG. 6 is a flowchart showing the process for sending a call response message according to the first embodiment of the present invention.

In the following, a description will be given of the operation of the cellular phone 100 according to the first embodiment referring to FIG. 6. FIG. 6 is a flowchart showing the process for sending a call response message according to the first embodiment of the present invention.

In the cellular phone 100, having been informed of an incoming call by the radio section 101 (step S101, Y), the controller 114 checks whether or not the cellular phone 100 is in silent mode (step S102). For example, before a meeting or riding a train, the user provides input via the main operating section 104 according to predetermined operating instructions to set the cellular phone 100 in silent mode. In response to the input by the user, the controller 114 sets the parameter information 1135 in the storage 113 to silent mode.

When the cellular phone 100 is in silent mode (step S102, Y), the controller 114 checks whether or not the cellular phone 100 is in answer mode (step S103). For example, when anticipating a situation in which the user cannot answer incoming calls, he/she provides input via the main operating section 104 according to predetermined operating instructions to set the cellular phone 100 in answer mode. In response to the input by the user, the controller 114 sets the parameter information 1135 in the storage 113 to answer mode.

If neither in silent mode (step S102, N) nor answer mode (step S103, N), the cellular phone 100 normally receives an incoming call (step S105). In this case, the controller 114 lets the cellular phone 100 ring until the user performs off-hook operation. After the off-hook operation, the controller 114 initiates the call control.

In this embodiment, when the user turns the upper housing 100A and the lower hosing 100B from closed to open position and the open/close detector 112 detects that the cellular phone 100 is in the open position, or he/she provides input via the main operating section 104 or the sub operating section 105 according to predetermined operating instructions to switch the cellular phone 100 to answer mode (step S104), the cellular phone 100 enters answer mode, which will be described below. The cellular phone 100 may enter answer mode by, for example, the depression of one or more predetermined buttons in the main operating section 104 or the sub operating section 105. Having received an incoming call, the controller 114 displays such information as the telephone number of the caller included in an incoming signal on the main display 110 or the sub display 111 and continues signaling the call until the off-hook operation by the user. In the case where the telephone number of the caller has been registered with corresponding information such as the name of the caller as the telephone directory information 1132, the controller 114 displays the information instead of the telephone number on the main display 110 or the sub display 111. The controller 114 displays the information on the main display 110 when the open/close detector 112 has detected that the cellular phone 100 is in the open position, while it displays the information on the sub display 111 when the detector 112 has detected that the cellular phone 100 is in the closed position.

When the open/close detector 112 detects a change from closed to open position or, regardless of the result of the detection by the detector 112, input is provided through the main operating section 104 or the sub operating section 105, the controller 114 sets the cellular phone 100 to off-hook state and places the incoming call on hold (step S106). That is, under the control of the controller 114, the radio section 101 transmits a call response signal, and on-hold sound data stored in the storage 113 is output to the radio section 101 so as to be transmitted therefrom. In addition, the controller 114 activates the stereo camera section 102 and the camera section 103 so that they become ready for shooting (step S107). The controller 114 activates the stereo camera section 102 when the open/close detector 112 has detected that the cellular phone 100 is in the open position, while it activates the camera section 103 when the detector 112 has detected that the cellular phone 100 is in the closed position. Incidentally, regardless of the result of the detection by the open/close detector 112, the controller 114 may always activate predetermined one of the stereo camera section 102 and the camera section 103. In the case of activating the stereo camera section 102, the controller 114 may activate one of the two cameras of the camera section 102.

Under the control of the controller 114, the stereo camera section 102 or the camera section 103 automatically shoots an image after a lapse of predetermined time period as for example in five seconds (step S108). During the time period, the user makes a pose or a gesture corresponding to his/her situation for the stereo camera section 102 or the camera section 103. The stereo camera section 102 or the camera section 103 stores the image data obtained by the shooting in the storage 113. The controller 114 performs image recognition to determine whether or not the image stored in the storage 113 matches any one of the model images exemplified in FIG. 5 (step S109).

The controller 114 performs the image recognition according to an image recognition program of the programs stored in the storage 113. First, for example, the controller 114 identifies a flesh-colored area to recognize the contours of the face. Next, the controller 114 identifies areas in different colors within the flesh-colored area to recognize the positions of eyes and lips of mouth. Then, in the case where the mouth area contains a portion, which is different in color from the lips, not smaller than the prescribed area, the controller 114 determines that the image matches the model image in the top row of the table shown in FIG. 5.

In the case where there is a flesh-colored part not smaller than the prescribed area in the vicinity outside the left contours of the face (on the left of the face image as viewed in FIG. 5), the controller 114 determines that the image matches the model image in the middle row of the table shown in FIG. 5. Further, in the case where there is a flesh-colored part not smaller than the prescribed area in the vicinity outside the lower contours of the face, the controller 114 determines that the image matches the model image in the bottom row of the table shown in FIG. 5. In, for example, Japanese Patent Application laid open No. HEI7-311833, there is found a detailed description of the face recognition method adopted herein. According to the technique described in the patent application, even when a model image differs from an image shot by the stereo camera section 102 or the camera section 103 in size of the face, a match between the two images can be checked based on the positions of eyes and lips of mouth. Moreover, even if the face is tilted in an image, the contours of the face can be extracted based on the positions of eyes and lips of mouth.

The above face recognition method is given only as an example. Another recognition method may be employed as long as it is capable of detecting the contours of the face and the position of lips of mouth as well as detecting a part not smaller than the prescribed area based on them. While, in this embodiment, the position of the hand and fingers is detected with respect to the contours of the face, the shape formed by the fingers, etc. may also be detected for more elaborate matching. In such a case, pattern matching may be performed between the shape formed by fingers etc. at a prescribed position in a model image (a predetermined position on the basis of the position of the face, etc.) and, for example, a flesh-colored area at a prescribed position or in the vicinity of the position in an image shot by the stereo camera section 102 or the camera section 103.

After that, the controller 114 selects a message corresponding to the model image that has been determined to match the image shot by the camera section with reference to the image conversion table (see FIG. 5), and fetches the message from the storage 113 (step S110). The controller 114 displays the message fetched from the storage 113 on the main display 110 or the sub display 111 (step S121). In the case of FIG. 5, the user assumes a pose corresponding to the model image in the bottom row of the table when he/she is on the train and cannot answer the incoming call. The user assumes a pose corresponding to the model image in the top row of the table shown in FIG. 5 when he/she is in a meeting and cannot answer the incoming call. Besides, the user assumes a pose corresponding to the model image in the middle row of the table shown in FIG. 5 when, for example, it is not necessary to explain to the caller why he/she does not answer the incoming call. After the image recognition properly performed by the controller 114, the main display 110 or the sub display 111 displays the message corresponding to the pose made by the user.

If the main display 110 or the sub display 111 does not display the message corresponding to the pose made by the user (step S122, N), the user provides input through the main operating section 104 or the sub operating section 105 for reshooting. The input is provided by, for example, the depression of one or more predetermined buttons in the main operating section 104 or the sub operating section 105. In response to the input, the process returns to step S108. Thus, the stereo camera section 102 or the camera section 103 reshoots the user in the pose.

Having checked that the message corresponding to the pose is displayed on the main display 110 or the sub display 111, the user provides input indicating his/her approval of the message through the main operating section 104 or the sub operating section 105. The input may be provided by, for example, the depression of one or more predetermined buttons in the main operating section 104 or the sub operating section 105. In response to the input, the controller 114 reads out the message from the storage 113, and generates voice data corresponding to the vocalized sound of the message to output the data to the radio section 101. The radio section 101 transmits audio signals corresponding to the voice data (step S123). Incidentally, voice data corresponding to each message may be previously stored in the storage 113 so that the controller 114 can read out the data therefrom, which eliminates the process to generate voice data.

Thereafter, if the parameter information 1135 in the storage 113 has been set so as to record messages (step S124, Y), the controller 114 stores voice data from the calling terminal received by the radio section 101 in an area reserved for recording messages, thereby recording a message from the caller (step S125). Subsequently, on-hook operation is performed (step S126) by, for example, the transmission of a disconnect signal from the radio section 101. If the parameter information 1135 has not been set to record messages (step S124, N), on-hook operation is performed directly without the process of step S125.

As is described above, in the first embodiment, when the user inputs an image with a particular gesture or pose in the cellular phone 100, it is possible to send a message corresponding to the gesture or pose to a calling terminal. As shown in FIG. 5, the message may contain the reason why the user cannot answer a call. Thereby, the caller can understand why the user of the cellular phone 100 dose not answer the phone, and is relieved of worry about not knowing the situation of the other party. Consequently, the user of the cellular phone 100 can achieve better communications with callers. Moreover, the user of the cellular phone 100 does not disturb others around him/her even when receiving an incoming call in a situation where he/she feels uncomfortable about talking on the phone (in a train, in a meeting, etc.) since he/she can inform the caller of his/her situation by a gesture or a pose.

Additionally, because the user can send a message to the caller by a gesture or a pose, the selection of a message is facilitated. That is, each model image can be defined to allow the user to make a gesture or a pose by which a message is intuitively understood. In FIG. 5, a gesture with a hand and fingers to the ear is associated with a message "I will call you back", and the user can easily conceive of the gesture when he/she wish to send a message saying "I will call you back". Thus, in this embodiment, improvement is achieved in user interfaces for sending a call response message.

Incidentally, in this embodiment, the message is transmitted as a voice message, it may be transmitted as text information. For example, when the telephone number of a caller has been registered with a corresponding email address as the telephone directory information 1132 in the storage 113, the controller 114 may transmit an email message to the address. In this case, the image data obtained in step S108 may be attached to the email message. With the image data attached to the email, a caller can more easily understand why the user of the cellular phone 100 dose not answer his/her call.

Besides, only the image data obtained in step S108 may be transmitted via email. Also in that case, a caller can easily understand why the user of the cellular phone 100 dose not answer his/her call.

Further, in this embodiment, the controller 114 checks whether or not the cellular phone 100 is in answer mode on the condition that the phone 100 is in silent mode (steps S102 and 103). However, even if the cellular phone 100 is not in silent mode, it may send a message to a calling terminal when set in answer mode.

Still further, in this embodiment, a storage (the storage 113) stores model images each containing form information to retain the form information. As a method of recognizing the form information from an image shot by a camera, the shot image is compared with the model images. Based on the result of the comparison, it is determined whether or not the shot image contains the form information. However, the method is cited merely by way of example and without limitation. For example, digitalized characteristics of forms or shapes (e.g. relative coordinate values of specific features of a shape formed by fingers indicating a prescribed pose) may be used as form information. In this case, a determination is made as to whether or not a shot image contains the form information by checking whether or not the image contains a part that matches values indicating characteristics of a prescribed form or whether or not the degree of match exceeds a prescribed threshold.

According to the first embodiment, a motion instruction information storage for storing information on motion instructions (e.g. information indicating a message to be selected) in association with form information (e.g. a pose or a gesture) is implemented by the storage 113 that stores model images, messages and an image conversion table. A motion instruction information selecting means for recognizing the form information from an image shot by a shooting means and selecting a motion instruction corresponding to the recognized form information from the motion instruction information storage, and a controller for controlling a portable terminal according to the motion instruction selected by the motion instruction information selecting means are implemented by the controller 114 which operates according to one or more programs. Besides, a transmission instruction information storage for storing information on transmission instructions (e.g. information indicating a message to be transmitted) in association with form information (e.g. a pose or a gesture) is implemented by the storage 113 that stores model images, messages and an image conversion table. A transmission instruction information selecting means for recognizing the form information from an image shot by a shooting means when a call is received and selecting a transmission instruction corresponding to the recognized form information from the transmission instruction information storage is implemented by the controller 114 which operates according to one or more programs. A controller for transmitting prescribed information to a calling source according to the transmission instruction selected by the transmission instruction information selecting means is implemented by the radio section 101 and the controller 114. In addition, a message information storage for storing information on different types of messages in association with form information is implemented by the storage 113 that stores model images, messages and an image conversion table. A message information selecting means for recognizing the form information from an image shot by a shooting means when a call is received and selecting a message corresponding to the recognized form information from the message information storage is implemented by the controller 114 which operates according to one or more programs. A message information transmitter for transmitting the message selected by the message information selecting means to a calling source is implemented by the radio section 101 and the controller 114.

Second Embodiment

In this embodiment, if a portable terminal is in silent mode, a message corresponding to the gesture or pose of the user is sent to a calling terminal.

Figure 7:
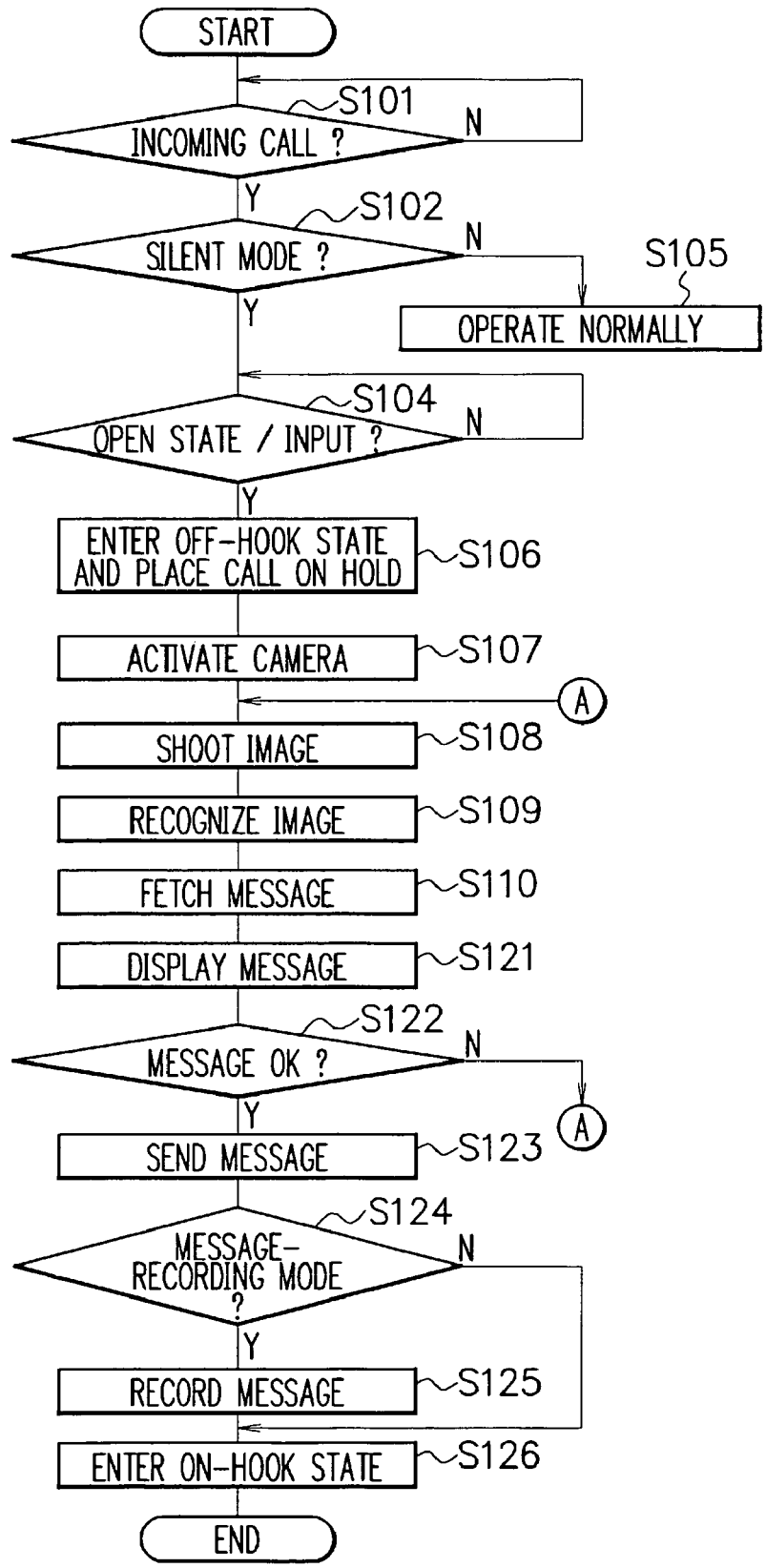
FIG. 7 is a flowchart showing the process for sending a call response message according to the second embodiment of the present invention.

In the following, a description will be given of the operation of the cellular phone according to the second embodiment referring to FIG. 7. FIG. 7 is a flowchart showing the process for sending a call response message according to the second embodiment of the present invention. Incidentally, the cellular phone in the second embodiment has the same construction as described previously for the cellular phone 100 in connection with FIGS. 1 and 2.

Having been informed of an incoming call by the radio section 101 (step S101,Y), the controller 114 checks whether or not the cellular phone 100 is in silent mode (step S102). When the cellular phone 100 is in silent mode (step S102, Y), the process directly proceeds to step S104. In other words, as long as the cellular phone 100 is in silent mode, even if not set in answer mode, the process from step S105 is performed when the open/close detector 112 detects that the phone 100 is in the open position, or the user provides input via the main operating section 104 or the sub operating section 105 so that the phone 100 enters answer mode. Otherwise, the cellular phone 100 operates in the same manner as in the first embodiment.

As is described above, in the second embodiment, the user can make the cellular phone 100 answer an incoming call even when it has not been previously set to answer mode. Therefore, it is convenient for user who tends to forget to set his/her cellular phone in answer mode.

Third Embodiment

In this embodiment, when a message is not proper, the next candidate message is automatically displayed.

Figure 8:
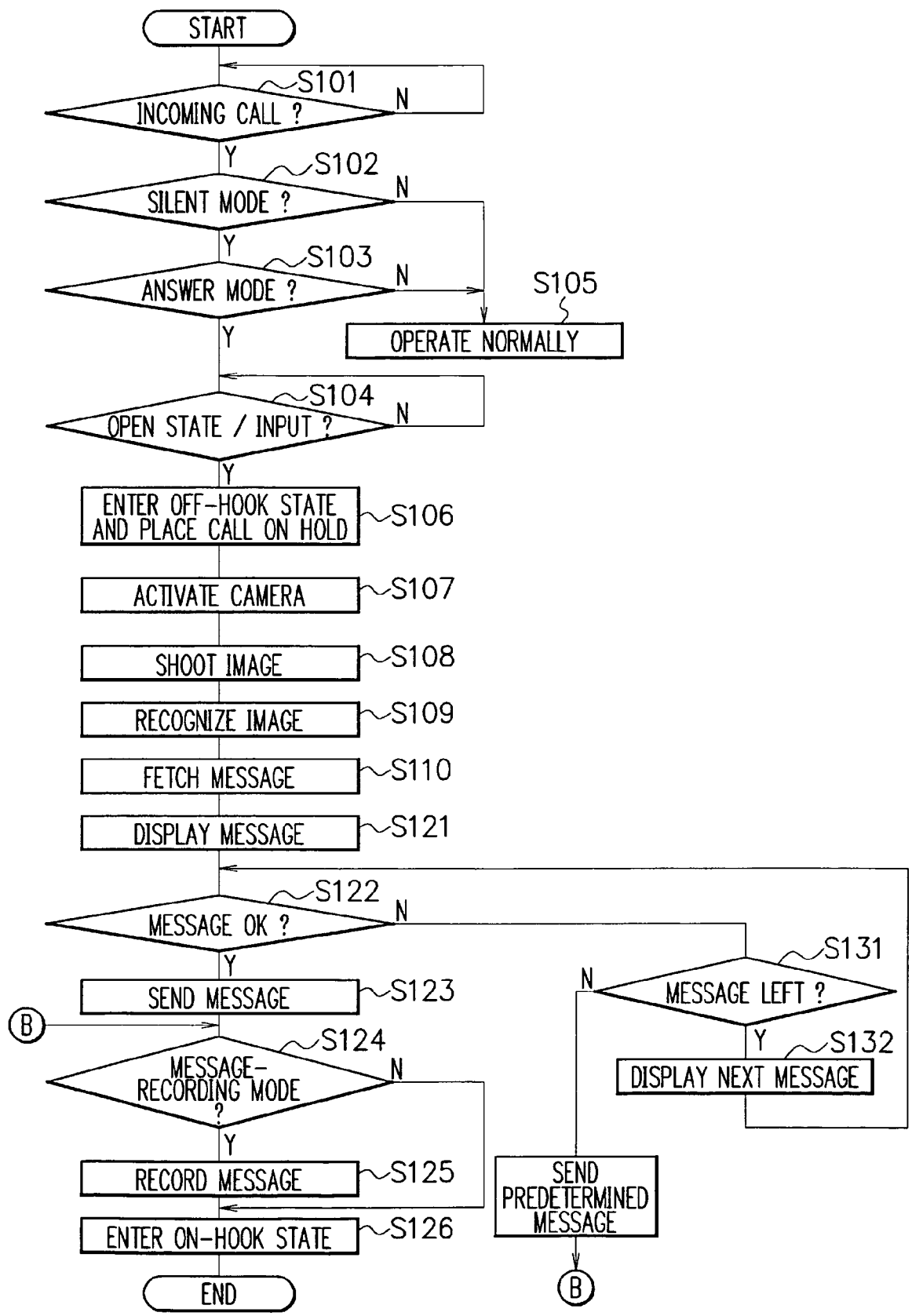
FIG. 8 is a flowchart showing the process for sending a call response message according to the third embodiment of the present invention.

In the following, a description will be given of the operation of the cellular phone according to the third embodiment referring to FIG. 8. FIG. 8 is a flowchart showing the process for sending a call response message according to the third embodiment of the present invention. Incidentally, the cellular phone in the third embodiment has the same construction as described previously for the cellular phone 100 in connection with FIGS. 1 and 2.

The process from step S101 through S121 is performed in the same manner as in the first embodiment described above in connection with FIG. 6. In this embodiment, however, if the main display 110 or the sub display 111 does not display a message corresponding to a pose assumed by the user (step S122, N), the user provides input indicating that the message is not appropriate via the main operating section 104 or the sub operating section 105. In response to the input by the user, the controller 114 displays the next candidate message on the main display 110 or the sub display 111 (step S132).

In the image recognition of this embodiment in step S109, the controller 114 calculates as a score the degree of similarity between image data obtained by the stereo camera section 102 or the camera section 103 and each model image. Referring to the model images exemplified in FIG. 5, when there is a flesh-colored part in the vicinity outside the left contours of the face in the image data obtained by the camera section, but the part differs in size from that of the model image, the degree of match between the sizes is the score indicating similarity. In like fashion, when the mouth area contains a part different in color from the lips, but the part differs in size from that of the model image, the degree of match between the sizes is the score indicating similarity. Additionally, in the case where the size of the face differs between the model image and the image shot by the stereo camera section 102 or the camera section 103, the controller 114 first performs normalization to adjust or match the size of the face in the image shot by the stereo camera section 102 or the camera section 103 to that in the model image. After that, the controller 114 compares the sizes of the flesh-colored parts or the parts different in color from the lips in the mouth area between the model image and the image shot by the stereo camera section 102 or the camera section 103.

According to the comparison after the normalization, when there is a flesh-colored part in the vicinity outside the lower contours of the face, but the part differs in size from that of the model image, the degree of match between the sizes is the score indicating similarity. Incidentally, the method of calculating the degree of similarity or a score is given only as an example. Another method may be employed as long as it is capable of detecting the contours of the face and the position of lips of mouth as well as detecting a prescribed area based on them.

For example, the model image in the top row of the table shown in FIG. 5. will be referred to as model image A, the model image in the middle row will be referred to as model image B, and the model image in the bottom row will be referred to as model image C. Besides, the similarity of the shot image to the model image A will be referred to as score A, that of the shot image to the model image B will be referred to as score B, and that of the shot image to the model image C will be referred to as score C.

In step S121, the controller 114 displays a message corresponding to the model image with the highest score on the main display 110 or the sub display 111. When, in step S122, the user provides input indicating that the message is not appropriate, the controller 114 checks if there is any message not corresponding to the model image with a score of 0 (indicating no match), which has not been displayed (step S131). If such message is still left (step S131, Y), the controller 114 displays a message corresponding to the model image with the next highest score on the main display 110 or the sub display 111 (step S132). The process in steps S122, S131 and S132 is repeated until the user provides input indicating that the message is appropriate, or there is left no message not corresponding to the model image with a score of 0 (indicating no match), which has not been displayed (step S131, N).

When the user provides input indicating that the message is appropriate, the radio section 101 transmits the message under the control of the controller 114 as in the first embodiment (step S123). Thereafter, the process from step S124 through S126 is performed. Having checked that there is left no message which has not been displayed (step S131, N), the radio section 101 transmits a predetermined fixed message under the control of the controller 114. The predetermined message may be the one as shown in the middle row of the table of FIG. 5. Then, the process proceeds to step S124.

According to the third embodiment, the user is not required to provide input for reshooting when the message displayed on the main display 110 or the sub display 111 is not proper, differently from the first and second embodiments. Thus, it is possible to reduce the burden of the user to transmit a call response message.

In this embodiment, while steps S131 and S132 are added to the operation of the first embodiment illustrated in FIG. 6, these steps may be added to the operation of the second embodiment of FIG. 7.

Fourth Embodiment

In addition to the operation of the first embodiment set forth above, this embodiment involves using schedule information.

Figure 9:
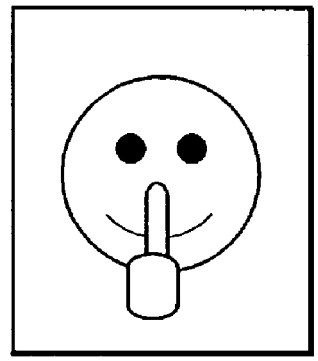
FIG. 9 is an explanatory diagram showing an example of schedule information and a message corresponding to the information.
Figure 9:
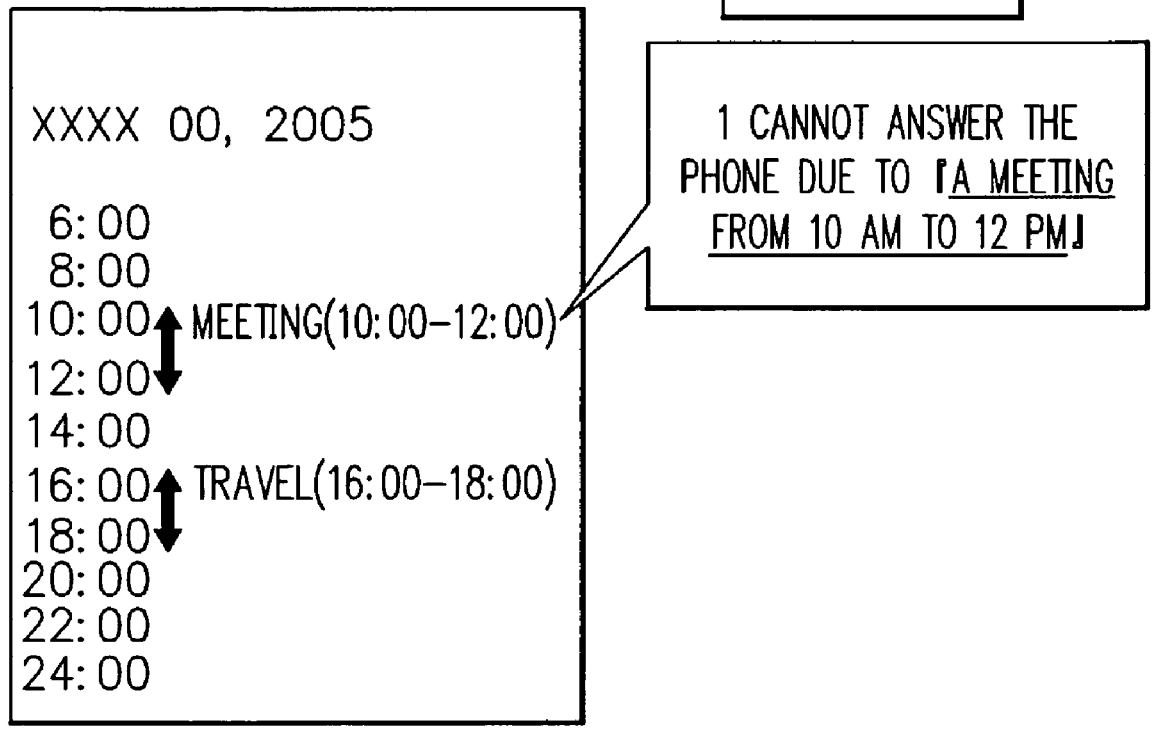

FIG. 9 is an explanatory diagram showing an example of schedule information and a message corresponding to the information. The schedule information as shown in FIG. 9 is stored in the storage 113. For example, having received an incoming call during the period between 10 am to 12 pm, the cellular phone 100 sends a call response message with the reason why the user does not answer the call included in the schedule information (in the example of FIG. 9, a meeting from 10 am to noon).

In the following, a description will be given of the operation of the cellular phone according to the fourth embodiment referring to FIG. 10. FIG. 10 is a flowchart showing the process for sending a call response message according to the fourth embodiment of the present invention. Incidentally, the cellular phone in the fourth embodiment has the same construction as described previously for the cellular phone 100 in connection with FIGS. 1 and 2.

The process from step S101 through S110 shown in FIG. 10 is performed in the same manner as in the first embodiment described above in connection with FIG. 6. In this embodiment, after the message is fetched from the storage 113 (step S110), the controller 114 checks whether or not a schedule has been set, that is, whether or not the storage 113 stores schedule information (step S141). In the case where the storage 113 stores schedule information (step S141, Y), the controller 114 further checks whether or not the schedule information includes information about the time of scheduled appointments. In the case where the storage 113 does not store schedule information and where, even if a schedule has been set, the schedule information does not include information about the time of scheduled appointments (step S141, N), the controller 114 operates in the same manner as in the first embodiment. More specifically, the controller 114 displays the message fetched from the storage 113 in step S110 on the main display 110 or the sub display 111 (step S121). After that, the process from step S122 through S126 is performed in the same manner as in the first embodiment.

When the schedule information includes information about the time of scheduled appointments, the controller 114 extracts the information (schedule) from the schedule information (step S142), and creates a message containing the extracted information (hereinafter referred to as a message with a schedule). The controller 114 displays the message with a schedule on the main display 110 or the sub display 111 (step S143). After that, the process proceeds to step S122.

It is assumed that the cellular phone 100 receives an incoming call during the period between 10 am to 12 pm, and that the shot image has been determined to match the model image in the top row of the table shown in FIG. 5 in step S109. FIG. 9 shows as an example the schedule information indicating that a meeting is held from 10 am to 12 pm. Based on the schedule information, the controller 114 creates a message saying, for example, "I cannot answer the phone due to a meeting from 10 am to 12 pm". Incidentally, the part "I cannot answer the phone due to" is fixed and previously stored in the storage 113 as a fixed message corresponding to the model image in the top row of the table shown in FIG. 5. The controller 114 creates a message with a schedule by adding information extracted from the schedule information to the fixed message.

According to the fourth embodiment, when the user feels uncomfortable about answering an incoming call by voice or talking on the phone, he/she can send a caller a message with the reason (because in a train, in a meeting, etc.) based on the schedule information. In addition, the message may contain information on the time period during which the user is not available on the phone based on the schedule information. Thereby, the caller is also informed of when the user of the cellular phone 100 will be able to answer the phone. In other words, the user can provide the caller with further information about the situation where he/she finds it difficult to talk on the phone making use of the schedule information. Thus, the caller does not have to telephone the user of the cellular phone 100 repeatedly. Moreover, the caller is relieved of having to wait for a call back from the user.

Incidentally, in the above description, the message corresponding to the model image in the top row of the table shown in FIG. 5 already contains information about "meeting". That is, there is overlap in information about "meeting" between the message corresponding to the model image and the schedule information. However, information as to "the time period" can be obtained only from the schedule information. Therefore, through the use of the schedule information, more detailed information can be provided to a calling terminal. On the other hand, if the message corresponding to the model image in the top row of the table shown in FIG. 5 does not contain information about "meeting" (for example, if the message only says "I cannot answer the phone right now"), the reason of the unavailability of the user on the phone can be obtained only through the use of the schedule information.

This embodiment involves the use of schedule information in addition to the first embodiment illustrated in FIG. 6. However, the second embodiment of FIG. 7 may include steps S141 to S143 of using schedule information.

Fifth Embodiment

In addition to the operation of the third embodiment set forth above, this embodiment involves using schedule information.

Figure 11:
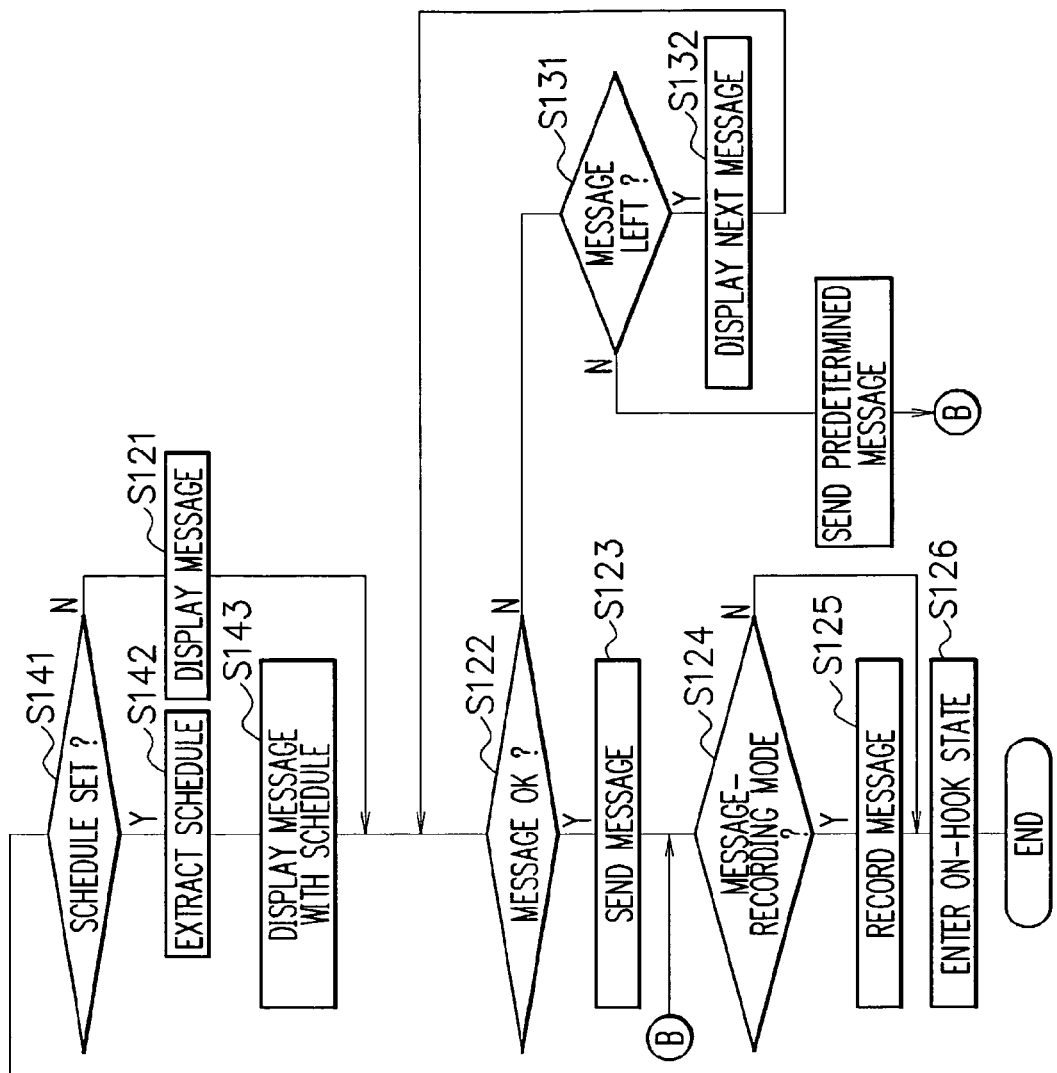
FIG. 11 is a flowchart showing the process for sending a call response message according to the fifth embodiment of the present invention.
Figure 11:
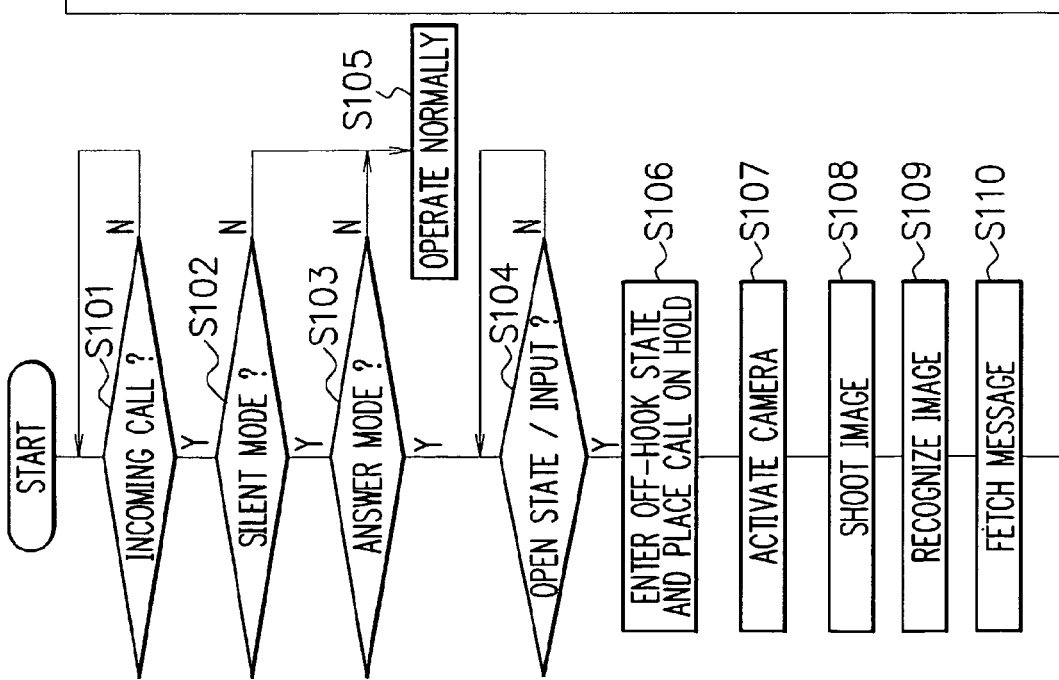

In the following, a description will be given of the operation of the cellular phone according to the fifth embodiment referring to FIG. 11. FIG. 11 is a flowchart showing the process for sending a call response message according to the fifth embodiment of the present invention. Incidentally, the cellular phone in the fifth embodiment has the same construction as described previously for the cellular phone 100 in connection with FIGS. 1 and 2.

Compared to the operation of the third embodiment illustrated in FIG. 8, that of the fifth embodiment shown in FIG. 11 further includes steps S141 to S143. The process from step S141 through S143 is performed in the same manner as in the fourth embodiment illustrated in FIG. 10.

According to the fifth embodiment, the user is not required to provide input for reshooting when the message displayed on the main display 110 or the sub display 111 is not proper. Thus, it is possible to reduce the burden of the user to transmit a call response message. Moreover, the user can provide the caller with more detailed information about the situation where he/she finds it difficult to talk on the phone making use of the schedule information.

Sixth Embodiment

In this embodiment, a message corresponding to a moving gesture or pose is sent to a calling terminal.

While, in the first to fifth embodiments, a still image is used as each model image, a moving image can also be used as a model image. In order to use a moving image as a model image, when inputting an image with a gesture or a pose in the cellular phone 100, the user shoots an image with a moving gesture or pose through the stereo camera section 102 or the camera section 103. For example, as shown in FIG. 12 (A), the user shoots his/her image with the stereo camera section 102 or the camera section 103 while moving his/her finger from the left to the right.

In this embodiment, the storage 113 stores a moving image, as a model image, composed of a plurality of frames in addition to the model images exemplified in FIG. 5. In the example of FIG. 12(A), the storage 113 stores an image consisting of three frames. The storage 113 also stores a message corresponding to the moving image as a model image. In addition, the image conversion table contains information indicating that the moving image as a model image is associated with the message. When performing image recognition (step S109), the controller 114 compares respective frames obtained by the stereo camera section 102 or the camera section 103 with the respective frames of the model image. Thus, the controller 114 checks whether or not there are a frame in which flesh-colored part exists in the vicinity outside the lower left contours of the face (corresponding to the left frame in FIG. 12(A), referred to as frame A), a frame in which flesh-colored part exists in the vicinity outside the lower middle contours of the face (corresponding to the middle frame in FIG. 12(A), referred to as frame B), and a frame in which flesh-colored part exists in the vicinity outside the lower right contours of the face (corresponding to the right frame in FIG. 12(A), referred to as frame C) in the frames obtained by the stereo camera section 102 or the camera section 103. When there are such frames and they exist in time series, as a frame that matches the frame A is the oldest while one that matches the frame C is the latest, the controller 114 determines that the input image matches the model image as a moving image.

The above recognition method is given only as an example. Another recognition method may be employed to recognize a moving gesture or a pose as long as it is capable of detecting the motion of an object having a predetermined shape. For example, only the frame A shown in FIG. 12(A) may be stored in the storage 113 as a model image. In this case, the controller 114 checks whether or not there is a frame corresponding to the frame A, that is, a frame in which a flesh-colored part exists in the vicinity outside the lower left contours of the face, in frames obtained by the stereo camera section 102 or the camera section 103. If there is such a frame, the controller 114 computes the barycentric position of the flesh-colored part. Besides, the controller 114 checks whether or not there is a frame in which a flesh-colored part exists below the contours of the face in frames later than the one corresponding to the frame A. If there is such a frame, the controller 114 computes the barycentric position of the flesh-colored part. When the barycentric position moves in one direction through a plurality of frames, the controller 114 determines that a moving image matching the model image has been input. In the storage 113, only the image of an object having a prescribed shape (e.g. a hand with a raised finger) may be stored without a face image. In this case, the controller 114 checks whether or not there is a frame which contains a part that matches the shape among frames obtained by the stereo camera section 102 or the camera section 103. If there is such a frame, the controller 114 computes the barycentric position of the part in the frame. Besides, the controller 114 checks whether or not there is a frame which contains a part that matches the shape among frames later than the one that has been determined to contain the part having the shape. If there is such a frame, the controller 114 computes the barycentric position of the part. When the barycentric position moves in one direction through a plurality of frames, the controller 114 determines that a moving image matching the model image has been input.

Further, the controller 114 determines whether or not the shot image matches any one of the model images shown in FIG. 5 in step S109.

Having determined that a moving image matching one of the model images has been input, the controller 114 transmits a message corresponding to the moving image or the model image stored in the storage 113 via the radio section 101.

Seventh Embodiment

In this embodiment, the cellular phone enters answer mode in response to a moving gesture or pose.

Figure 13:
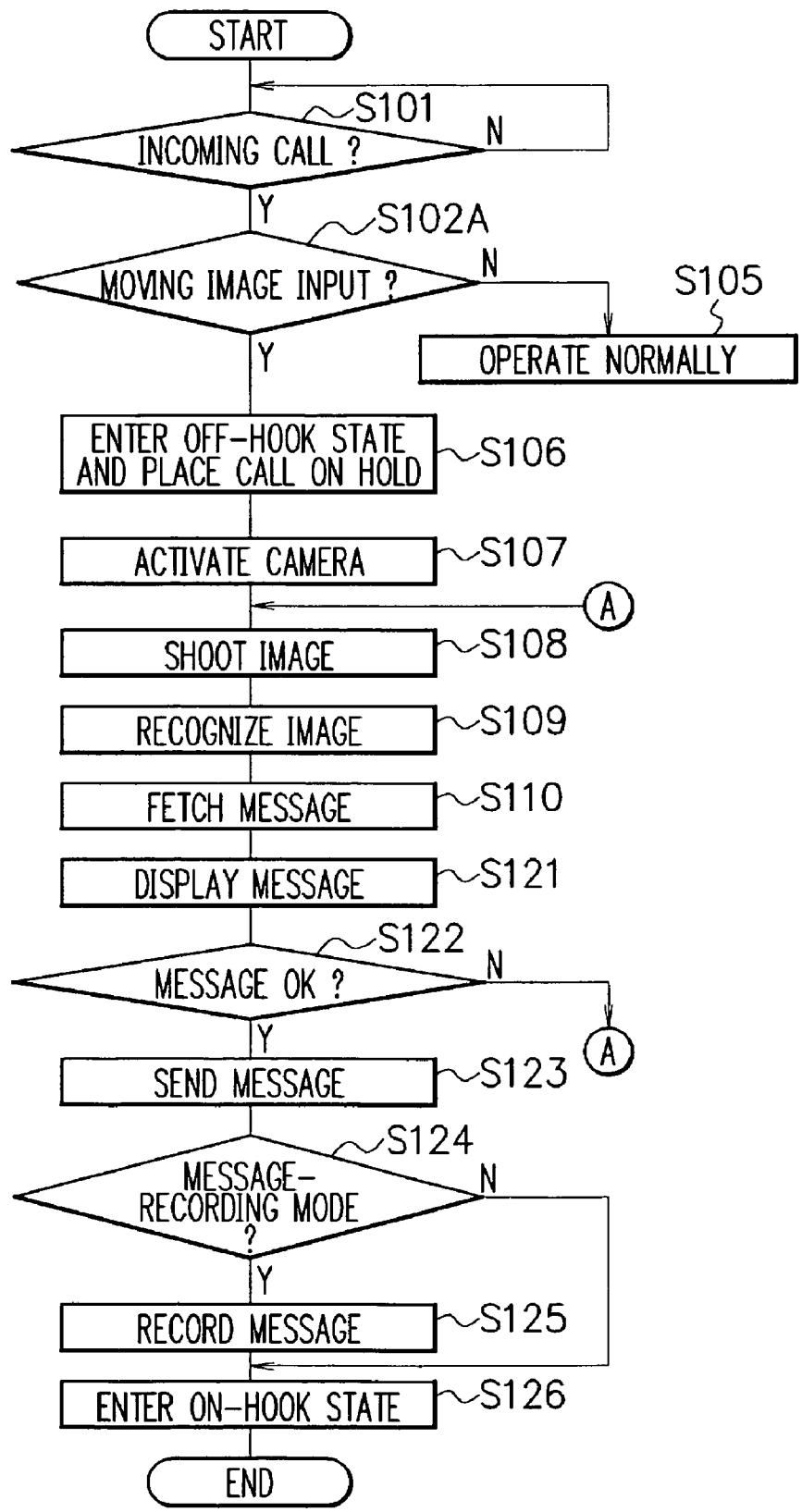
FIG. 13 is a flowchart showing the process for sending a call response message according to the seventh embodiment of the present invention.

In the following, a description will be given of the operation of the cellular phone according to the seventh embodiment referring to FIG. 13. FIG. 13 is a flowchart showing the process for sending a call response message according to the seventh embodiment of the present invention. Incidentally, the cellular phone in the seventh embodiment has the same construction as described previously for the cellular phone 100 in connection with FIGS. 1 and 2.

First, having been informed of an incoming call by the radio section 101 (step S101, Y), the controller 114 activates the stereo camera section 102 or the camera section 103. Then, the controller 114 determines whether or not the user has made a predetermined pose or gesture within prescribed time (e.g. five seconds) based on a moving image shot by the stereo camera section 102 or the camera section 103 (step S102A). More specifically, after a lapse of predetermined time period, the stereo camera section 102 or the camera section 103 shoots a moving image for a prescribed short time period (e.g. one second). The controller 114 makes a determination based on the image composed of some frames obtained by the stereo camera section 102 or the camera section 103. On this occasion, the stereo camera section 102 or the camera section 103 may perform the pseudo-shooting of a moving image of three to five frames per second. As an example of the predetermined pose or gesture may be given the motion of a finger from the left to the right shown in FIG. 12(A). Although a moving image is used to switch the cellular phone to answer mode in this embodiment differently from the sixth embodiment in which it is used to send a message, a determination can be made as to whether or not the user has made a predetermined moving gesture or pose in the same manner as in the sixth embodiment.

When determining that the user has made a predetermined pose or gesture within prescribed time, the controller 114 sets the cellular phone to off-hook state and places the incoming call on hold (step S106) as in the first embodiment. Thereafter, the process from step S107 is performed. In this connection, the stereo camera section 102 or the camera section 103 has already been activated, and therefore, step S107 may be skipped.

According to the seventh embodiment, the user can switch the cellular phone 100 to answer mode by just shooting an image with a prescribed motion through the stereo camera section 102 or the camera section 103. Thus, it is possible to simplify user interfaces for switching the cellular phone to answer mode. Incidentally, this embodiment involves the process for switching the cellular phone to answer mode by a moving gesture or pose in addition to the first embodiment illustrated in FIG. 6. However, the third embodiment of FIG. 8 (in which when a message is not proper, the next candidate message is automatically displayed) or the fourth embodiment of FIG. 10 (in which schedule information is additionally utilized) may further involves switching the cellular phone to answer mode by a moving gesture or pose.

In FIG. 13, the process in step S102A starts immediately after an incoming call is received. Preferably, however, designated presetting (e.g. the setting of silent mode) by the user causes the cellular phone 100 to perform the process in step S102A. Otherwise, the cellular phone 100 operates in the same manner as in the first to sixth embodiments.

Eighth Embodiment

In this embodiment, the cellular phone enters answer mode in response to a gesture or pose as a still image.

Figure 14:
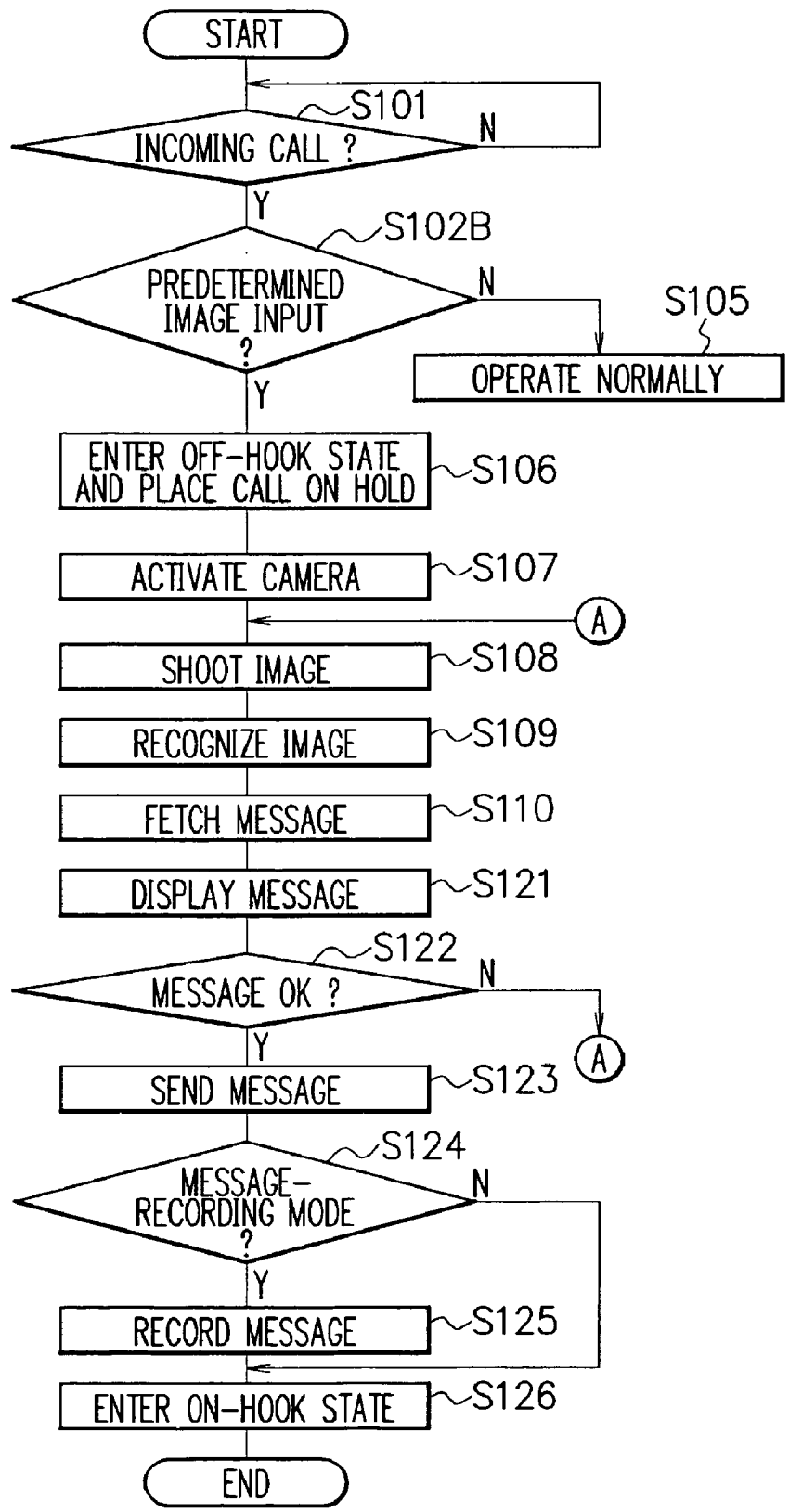
FIG. 14 is a flowchart showing the process for sending a call response message according to the eighth embodiment of the present invention.

In the following, a description will be given of the operation of the cellular phone according to the eighth embodiment referring to FIG. 14. FIG. 14 is a flowchart showing the process for sending a call response message according to the eighth embodiment of the present invention. Incidentally, the cellular phone in the eighth embodiment has the same construction as described previously for the cellular phone 100 in connection with FIGS. 1 and 2.

While the cellular phone enters answer mode in response to a moving gesture or pose in the seventh embodiment, it may enter answer mode in response to a still gesture or pose. FIG. 12(B) shows an image with the gesture of a hand forming a peace sign as an example of a model image. For example, as shown in FIG. 12(B), a pose or gesture with a hand forming a peace sign may switch the cellular phone to answer mode.

First, having been informed of an incoming call by the radio section 101 (step S101, Y), the controller 114 activates the stereo camera section 102 or the camera section 103. Then, the controller 114 determines whether or not the user has made a predetermined pose or gesture within prescribed time (e.g. five seconds) based on an image shot by the stereo camera section 102 or the camera section 103 (step S102B). More specifically, after a lapse of predetermined time period, the stereo camera section 102 or the camera section 103 automatically shoots an image. The controller 114 makes a determination based on the image shot by the stereo camera section 102 or the camera section 103.

In the case of using a model image as shown in FIG. 12(B), for example, the controller 114 checks whether or not there is a flesh-colored part having two protrusions in the vicinity outside the lower right contours of the face in the image shot by the stereo camera section 102 or the camera section 103, thereby determining whether or not the shot image matches the model image. The above determination method is given only as an example, and other methods may be employed.

When determining that the user has made a predetermined pose or gesture within prescribed time, the controller 114 sets the cellular phone to off-hook state and places the incoming call on hold (step S106) as in the first embodiment. Thereafter, the process from step S107 is performed. In this connection, the stereo camera section 102 or the camera section 103 has already been activated, and therefore, step S107 may be skipped.

According to the eighth embodiment, the user can switch the cellular phone 100 to answer mode by just shooting an image in a prescribed pose or gesture with the stereo camera section 102 or the camera section 103. Thus, it is possible to simplify user interfaces for switching the cellular phone to answer mode. Incidentally, this embodiment involves the process for switching the cellular phone to answer mode by a prescribed pose or gesture in addition to the first embodiment illustrated in FIG. 6. However, the third embodiment of FIG. 8 (in which when a message is not proper, the next candidate message is automatically displayed) or the fourth embodiment of FIG. 10 (in which schedule information is additionally utilized) may further involves switching the cellular phone to answer mode by a prescribed pose or gesture.

Additionally, in this embodiment, a model image other than those corresponding to messages as exemplified in FIG. 5 is employed to switch the cellular phone to answer mode. One of the model images each corresponding to a message may be utilized for this purpose. Further, in FIG. 14, the process from step S107 through S109 may be skipped. In such a case, a message may be selected based on the image used for the determination in step S102B. With this construction, on receipt of an incoming call, not only can the user switch the cellular phone 100 to answer mode, but he/she can also make it send the caller a desired message as a call response message by just shooting his/her image in a pose or gesture corresponding to the message.

In FIG. 14, the process in step S102B starts immediately after an incoming call is received. Preferably, however, designated presetting (e.g. the setting of silent mode) by the user causes the cellular phone 100 to perform the process in step S102A. Otherwise, the cellular phone 100 operates in the same manner as in the first to sixth embodiments.

In the seventh and eighth embodiments, a pose or a gesture for switching the cellular phone to answer mode corresponds to the form information associated with the motion instruction information. The storage 113 also stores information on the association between the answer mode and a prescribed pose or gesture as the form information for switching the cellular phone to answer mode.

Ninth Embodiment

In this embodiment, the cellular phone enters answer mode based on the setting of schedule information.

Figure 15:
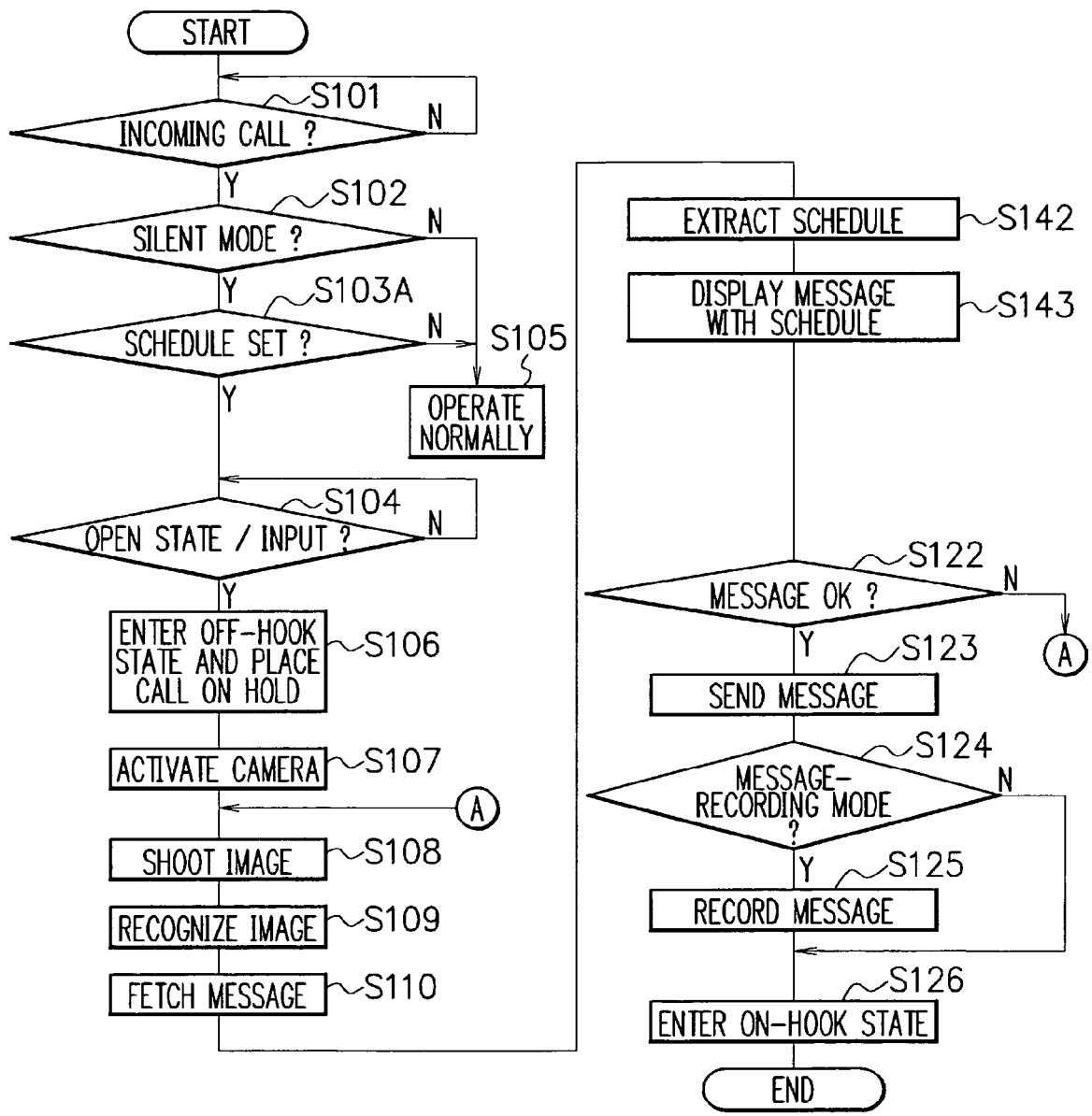
FIG. 15 is a flowchart showing the process for sending a call response message according to the ninth embodiment of the present invention.

In the following, a description will be given of the operation of the cellular phone according to the ninth embodiment referring to FIG. 15. FIG. 15 is a flowchart showing the process for sending a call response message according to the ninth embodiment of the present invention. Incidentally, the cellular phone in the ninth embodiment has the same construction as described previously for the cellular phone 100 in connection with FIGS. 1 and 2.

First, having been informed of an incoming call by the radio section 101 (step S101, Y), the controller 114 checks whether or not the cellular phone 100 is in silent mode (step S102). Subsequently, the controller 114 checks whether or not a schedule has been set (step S103A). In the case where a schedule has been set (step S103A, Y), the cellular phone 100 enters answer mode when the open/close detector 112 detects that the phone 100 is in the open position, or the user provides input via the main operating section 104 or the sub operating section 105 according to predetermined operating instructions to switch the phone 100 to answer mode as in the first embodiment (step S104). Incidentally, in this embodiment, the controller 114 determines that a schedule has been set when the storage 113 stores schedule information and also the schedule information includes information about the time of scheduled appointments.

Additionally, a specific mark, a symbol, a word, etc. may be defined as a key for switching the cellular phone 100 to answer mode so that the phone 100 enters answer mode when the controller 114 has determined that an incoming call is received during a time period denoted by the key in schedule information. In this case, the user attaches the key to the time period during which he/she will not be able to answer incoming calls when setting the schedule information.

According to the ninth embodiment, when set in silent mode, the cellular phone 100 automatically enters answer mode based on schedule information. Thus, it is possible to further simplify user interfaces for switching the cellular phone to answer mode. Incidentally, this embodiment involves the process for switching the cellular phone to answer mode based on schedule information in addition to the first embodiment illustrated in FIG. 6. However, the third embodiment of FIG. 8 (in which when a message is not proper, the next candidate message is automatically displayed) or the fourth embodiment of FIG. 10 (in which schedule information is additionally utilized) may further involves switching the cellular phone to answer mode based on schedule information.

In FIG. 15, the process of step S103A may be performed directly without the process of step S102. Besides, the order of steps S103A and S104 may be reversed. That is, the controller 114 may check whether or not a schedule has been set after the detection of the open position by the open/close detector 112, and switch the cellular phone to answer mode when a schedule has been set.

Tenth Embodiment

In this embodiment, a model image is updated or customized.

Figure 16:
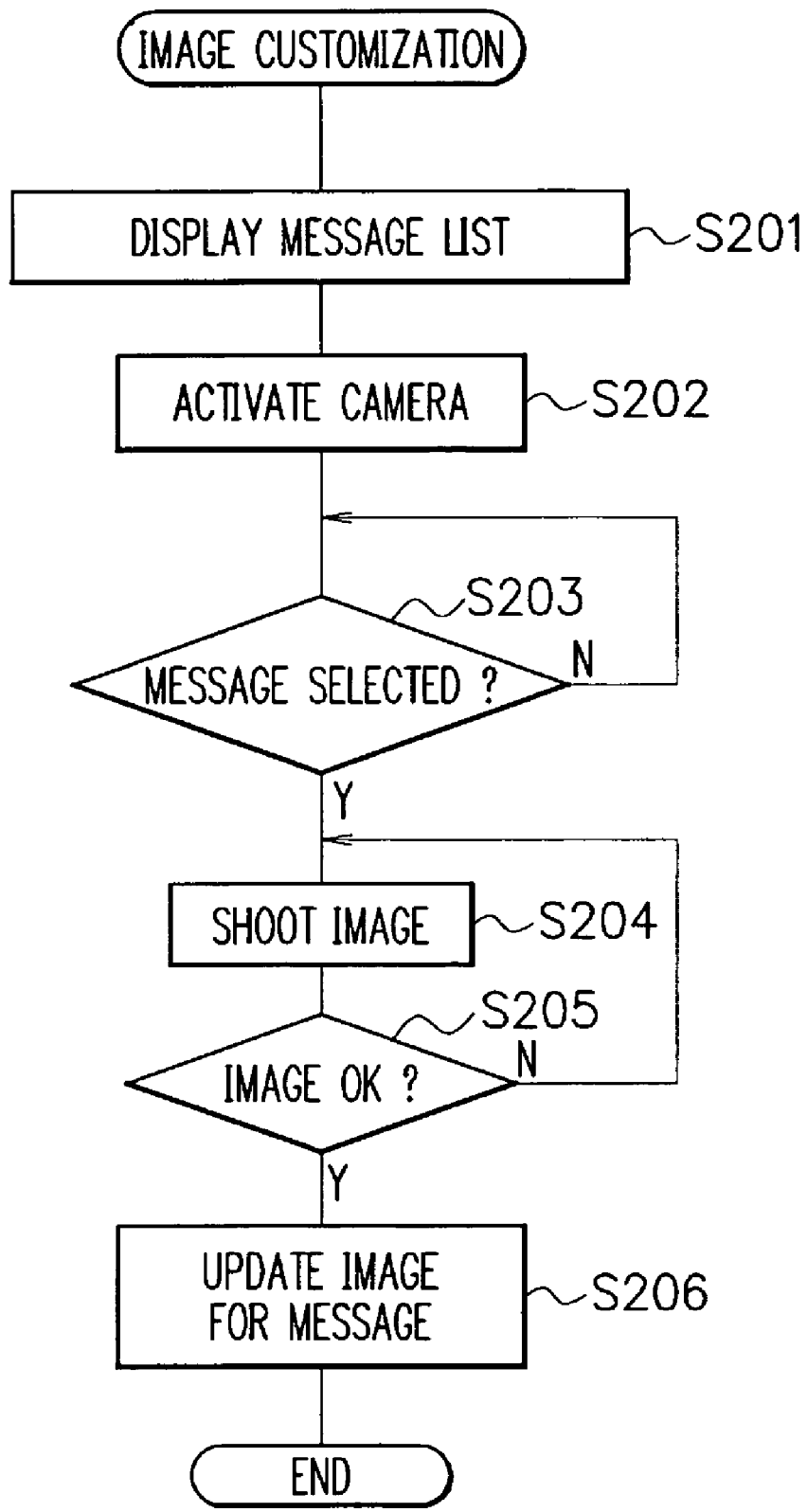
FIG. 16 is a flowchart showing the operation according to the tenth embodiment of the present invention.

In the embodiments described above, it is assumed that model images and corresponding messages are set, for example, when the cellular phone 100 is manufactured by the cellular-phone manufacturer: model images have already been set in the storage 113 before the user purchases the phone. The user may change the model images. FIG. 16 is a flowchart showing the process when the user changes one model image to another according to the tenth embodiment of the present invention.

When the user provides input via the main operating section 104 to change a model image, the controller 114 displays a message list on the main display 110 in response to the input (step S201). Subsequently, the controller 114 activates, for example, the stereo camera section 102 (step S202). The user selects a message from the message list (step S203). After that, the user shoots his/her image in a pose or a gesture to be associated with the selected message through the stereo camera section 102 (step S204). The stereo camera section 102 outputs image data obtained to the controller 114. The controller 114 stores the image data output from the stereo camera section 102 in the storage 113 as well as displaying the image shot by the camera section 102 on the main display 110.

Having checked that a desired image (an image with a desired gesture or pose) is displayed on the main display 110 (step S205, Y), the user enters input indicating his/her approval of the image through the main operating section 104. In response to the input, the controller 114 replaces the model image corresponding to the message selected in step S203 with the image shot in step S204 (step S206). When, the user provides input indicating that the image is not appropriate or a desired one (step S205, N), the process from step S204 is repeated.

As just described, if an application for updating or customizing model images is installed on the cellular phone 100, it is possible to set or change model images to suit the needs of the user. Consequently, improvement is achieved in the accuracy of image recognition performed by the controller 114 in step S109.

Eleventh Embodiment

In this embodiment, a message corresponding to a model image is changed.

Figure 17:
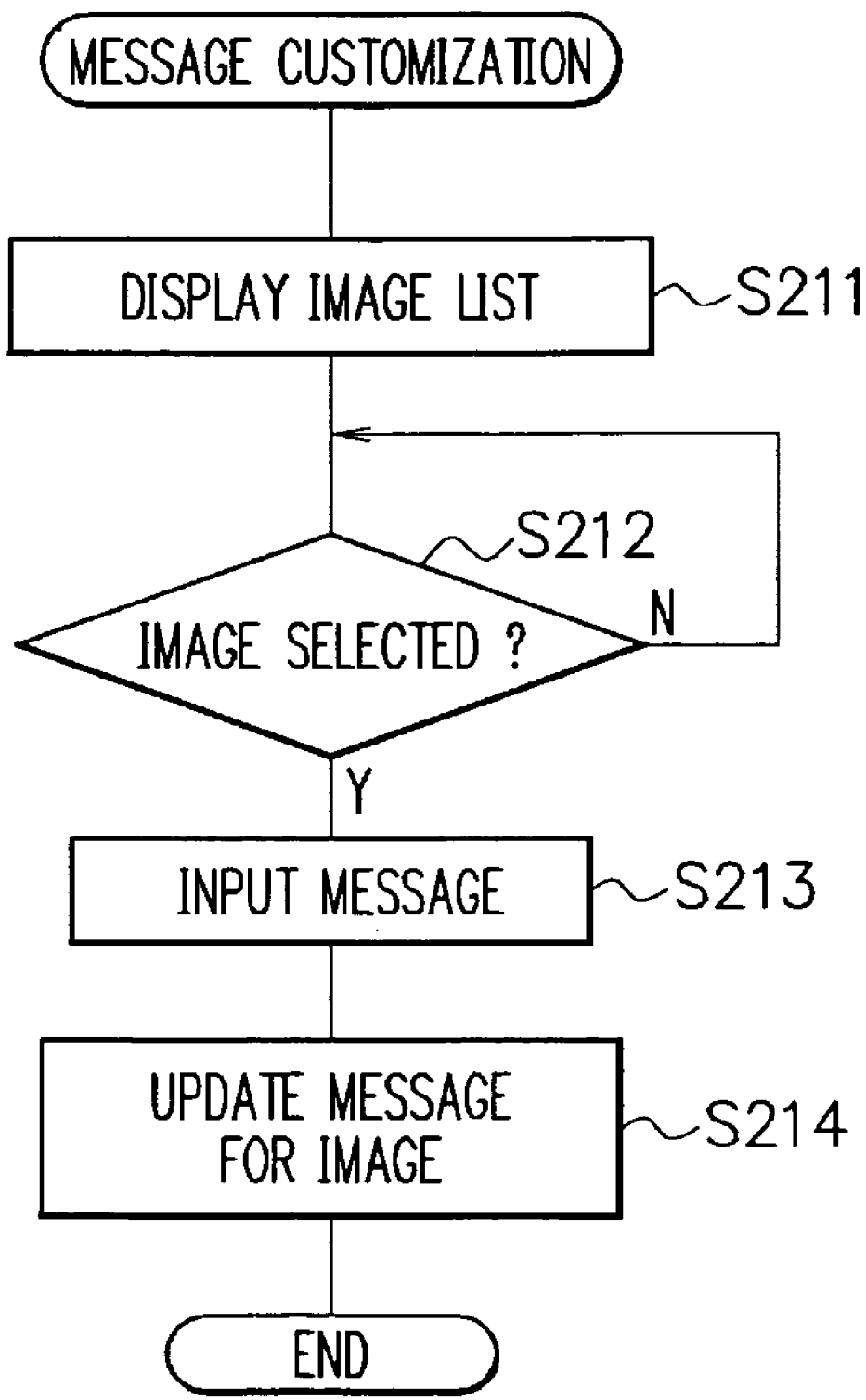
FIG. 17 is a flowchart showing the operation according to the eleventh embodiment of the present invention.

In the embodiments described above, it is assumed that messages each corresponding to a model image are set, for example, when the cellular phone 100 is manufactured by the cellular-phone manufacturer: messages have already been set in the storage 113 before the user purchases the phone. The user may change the messages. FIG. 17 is a flowchart showing the process when the user changes one message to another according to the eleventh embodiment of the present invention.

When the user provides input via the main operating section 104 to change a message, the controller 114 displays a model image list on the main display 110 in response to the input (step S211). The user selects a model image from the model image list (step S212). After that, the user inputs a message using keys or buttons of the main operating section 104 (step S213). Thereby, the controller 114 replaces the message corresponding to the model image selected in step S212 with the message input in step S213 (step S214).

As just described, if an application for updating or customizing messages is installed on the cellular phone 100, it is possible to set or change messages to suit the needs of the user.

According to the eleventh embodiment, in combination with the tenth embodiment, the user can associate an arbitrary model image with any message. For example, before entering a place where it is difficult to answer an incoming call by voice or talk on the phone, the user can shoot a characteristic feature of the place to register its image in the cellular phone 100 as a model image and associate the image with a message such as "I cannot answer the phone right now". Thus, when actually receiving a call, the user can send the message to the caller by shooting the characteristic feature of the place. As examples of places where it is difficult to talk on the phone may be cited noisy places such as an amusement arcade or a game hall. In an amusement arcade, a game machine may be shot as a characteristic feature of the place. Besides, model images (and corresponding messages) may be set in the storage 113 when the cellular phone 100 is manufactured by the cellular-phone manufacturer with respect to some places where it would be difficult to talk on the phone.

Twelfth Embodiment

While, in the embodiments described above, each model image is associated with one message as shown in FIG. 5, it may be associated with more than one message as shown in FIG. 18(A) so that an appropriate one can be selected from the messages.

For example, as shown in FIG. 18(B), if people the user may contact are divided into groups in the telephone directory information, each group is associated with a message. In FIG.

18, when an incoming signal includes the telephone number of a caller classified into group A, the controller 114 fetches a message in row "A" of the table shown in FIG. 18(A) from the storage 113 in step S110. On the other hand, when an incoming signal includes the telephone number of a caller classified into group B, the controller 114 fetches a message in row "B" of the table shown in FIG. 18(A) from the storage 113 in step S110. Incidentally, in the example of FIG. 18(A), messages classified as "A" are polite or formal in expression and generally sent to user's superiors, distant relatives and the like. Meanwhile, messages classified as "B" are casual or informal in expression and generally sent to user's friends and the like.

Figure 18:
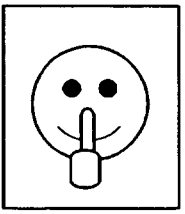
FIG. 18(A) is an explanatory diagram showing examples of model images each being associated with a plurality of messages.
FIG. 18(B) is an explanatory diagram showing an example of telephone directory information.
Figure 18:
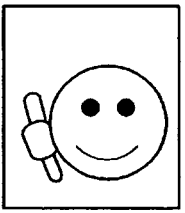
Figure 18:

The groups and classification in FIG. 18 are given merely by way of example and without limitation. People in the telephone directory information may be arbitrarily divided into any number of groups. Further, a description has been given of the case where a message is selected from plural messages associated with one model image based on the classification from the telephone directory information. However, a message may be selected differently and arbitrarily based on, for example, the time or season when a call is received.

Figure 19:
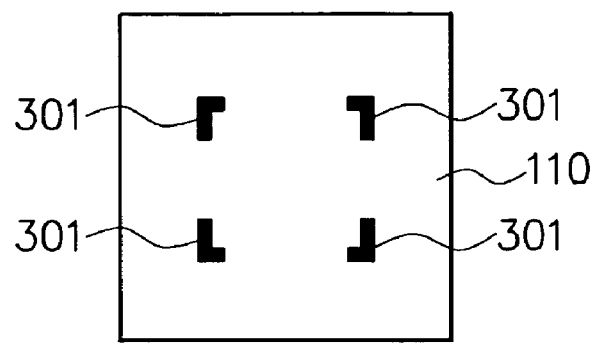
FIG. 19 is an explanatory diagram showing an example of a frame displayed on a display.

In the embodiments described above, when an image is shot in step S108, the user adjusts the cellular phone 100 to properly set the position of his/her face in the image. On this occasion, the controller 114 may display a frame 301 corresponding to the face image recognition area on the main display 110 or the sub display 111, which serves as the viewfinder of the stereo camera section 102 and the camera section 103, as shown in FIG. 19. FIG. 19 shows the frame 301 displayed on the main display 110 as an example. With the frame 301, the user can shoot an image so that his/her face can be positioned within the face image recognition area of the controller 114. Thereby, the area in which the controller 114 identifies or extracts the contours of a face can be defined. Thus, image recognition can be performed more accurately at a higher speed.

Additionally, in the embodiments described above, when having determined that the image shot in step S108 does not match any one of the model images, the controller 114 may provide the user with this information by, for example, activating a vibrator or displaying the information on the main display 110 or the sub display 111.

Further, in the embodiments described above, although the image recognition function of the cellular phone 100 is used to select a call response message, it may be utilized for other purposes. For example, if parameters of a calling terminal can be remote-controlled through communication, the controller 114 may transmit a command for controlling the parameters via the radio section 101 so that the calling terminal suspends the transmission to the cellular phone 100.

In response to an incoming call from a terminal such as a cellular phone, the cellular phone 100 may send the calling terminal image data via email, etc. rather than a call response message corresponding to an image input by the user. In this case, model images and corresponding response messages as described above are stored in the storage of the calling terminal. Besides, as well as the image recognition function, the controller of the calling terminal has a function for identifying a response message based on image recognition. In the calling terminal, the controller performs image recognition with respect to the image data of an image received from the cellular phone 100, and outputs a message corresponding to the recognized image from the audio output unit of the terminal. With this construction, the caller also understands that the user of the cellular phone 100 cannot answer the phone and the reason. Incidentally, the message corresponding to the recognized image may be displayed on the display of the calling terminal instead of being output by voice from the audio output unit, or may be displayed on the display as well as being output by voice from the audio output unit.

More specifically, the calling terminal or the calling cellular phone may comprise a message information storage for storing information on different types of messages in association with form information, a message information selecting means for recognizing the form information from an image received from the cellular phone 100 as an opposite party and selecting a message corresponding to the recognized form information from the message information storage, and a message outputting means, such as an audio output unit or a display, for outputting the message selected by the message information selecting means.

Still further, the cellular phone 100 is capable of identifying its location through the GPS receiver 117 installed thereon as shown in FIG. 2. Therefore, on the cellular phone 100 may be installed an application, which implements a combination of functions for positioning and transmitting a message corresponding to recognized an image. For example, when sending the other terminal the image data of a landscape image shot through the stereo camera section 102 or the camera section 103, the controller 114 may create a message consisting of, for example, positional information obtained from the GPS receiver 117 and a fixed message such as "I am in", thereby transmitting the image data together with the message. In the case where the cellular phone 100 stores geographic information, the controller 114 may extract a geographic or place name (Imperial Palace, Disneyland, etc.) from the geographic information based on the positional information to create a message consisting of the place name and a fixed message such as "I am in", thereby transmitting the image data together with the message. On this occasion, the user can switch the cellular phone 100 to mode for adding a message containing positional information to an image to be sent to a caller by, for example, shooting his/her image in a specific pose or gesture as employed in the seventh and eighth embodiments. In such a case, the storage 113 also stores information on the association between this mode and form information (e.g. a specific pose or gesture) for switching the cellular phone 100 to the mode. Incidentally, when image data is input from the stereo camera section 102 or the camera section 103, the controller 114 may transmit only a message containing positional information such as a place name by voice or text without the image data obtained by the camera section.

Still further, in the embodiments described above, the specific pose or gesture of a hand and fingers in the vicinity of a face in an image is mainly used as form information to be recognized. However, form information for image recognition is not restricted to such pose or gesture. Examples of form information include, but are not limited to, a characteristic feature of a place where it is difficult to talk on the phone as is described in the eleventh embodiment.

Thirteenth Embodiment

Figure 20:
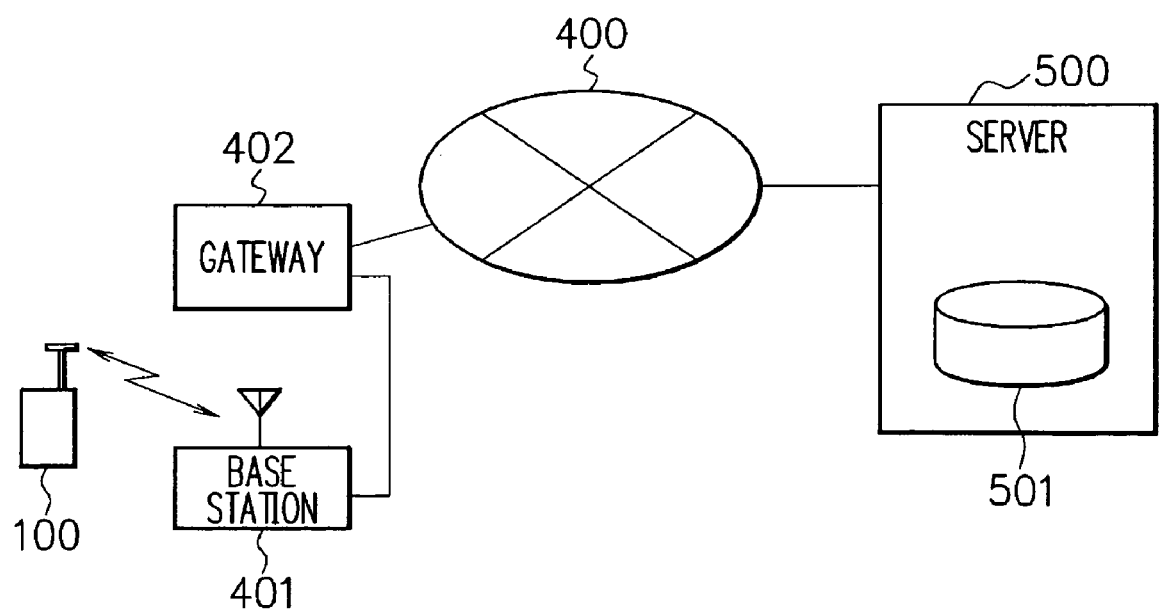
FIG. 20 is a diagram showing an example of the construction of a system including a server.

While, in the embodiments described above, the cellular phone 100 performs all the processes of recognizing an image, selecting a message corresponding to the image recognized, and transmitting the message selected. However, part of the processes may be performed by another device. FIG. 20 is a diagram showing an example of the construction of a system including a server. The system comprises a communication network 400 such as the Internet, a base station 401, a gateway 402, and a server 500. The server 500 includes a database 501. As can be seen in FIG. 20, the server 500 is accessible via the communication network 400, the base station 401, and the gateway 402 from the cellular phone 100. If the server 500 stores model images each being associated with a message, the cellular phone 100 may send the server 500 the image data obtained in step S108 together with information for identifying a calling terminal such as a telephone number and an email address. On receipt of the image data from the cellular phone 100, the server 500 may retrieve a model image that matches the image data to send a message corresponding to the model image to the calling terminal.

The server 500 is provided with a storage having the same construction as described previously for the storage 113 that stores model images in association with messages. The server 500 is also provided with a controller such as CPU (Central Processing Unit) that operates according to one or more programs. The controller performs image recognition with respect to image data received from the cellular phone 100, and transmits a message corresponding to the recognized image to a calling terminal by, for example, email.

More specifically, the server 500 comprises a message information storage for storing information on different types of messages in association with form information, and a controller for recognizing the form information from an image transmitted from a portable terminal which has received an incoming call from a calling source, selecting a message corresponding to the recognized form information from the message information storage, and transmitting the selected message to the calling source under program control.

In this construction, the database 501 may have areas for respective users so that each user can send the server 500 image data obtained through the stereo camera section 102 or the camera section 103 to store the data in the area assigned to him/her in the database 501.

As set forth hereinabove, in accordance with the present invention, even when the user of a portable terminal cannot answer an incoming call, the user of the portable terminal can easily inform a caller of the reason why he/she does not answer the call and his/her situation that does not allow him/her to answer the call. Further, it is possible to give instructions to the portable terminal by inputting an image, which simplifies user interfaces.

Further, the present invention is applicable to various portable terminals such as cellular phones provided with a camera function and a radio communication function.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A portable terminal comprising:
    a radio communication means;
    a message information storage for storing information on different types of messages in association with information on forms, wherein the message information storage stores at least one image that is indicative of a location where it is difficult for the user to talk on the phone as an image containing the form information;
    a shooting means for shooting an image indicative of a location when a call is received;
    a message information selecting means for recognizing a form that is indicative of a location from the image shot by the shooting means by comparing the image shot by the shooting means to the at least one image stored on the message information storage, and selecting a message corresponding to the recognized form from the message information storage; and
    a message information transmitter for transmitting the message selected by the message information selecting means to a calling source.

2. The portable terminal claimed in claim 1, wherein the message information storage stores an image of body parts in a prescribed pose or gesture as an image containing the form information.

3. The portable terminal claimed in claim 2, wherein the message information storage stores an image of body parts of the user of the portable terminal in a prescribed pose or gesture as an image containing the form information.

4. The portable terminal claimed in claim 1, wherein the message information storage stores a static image as an image containing the form information.

5. The portable terminal claimed in claim 1, wherein the message information storage stores a moving image as an image containing the form information.

6. The portable terminal claimed in claim 1, wherein the message information transmitter transmits text information as a message.

7. The portable terminal claimed in claim 1, wherein the message information transmitter includes a voice synthesizer for synthesizing voice sounds corresponding to a message, and transmits audio signals as a message.

8. The portable terminal claimed in claim 1, wherein the message information transmitter transmits the image shot by the shooting means in addition to a message.

9. The portable terminal claimed in claim 1, further comprising:
    a display;
    an operating section by which the user provides input; and
    a display control means for displaying a message on the display before the message information transmitter transmits the message to the calling source;
    wherein the message information transmitter transmits a message after the user provides confirmatory input.

10. The portable terminal claimed in claim 1, further comprising:
    a positional information outputting means for outputting positional information indicating the current location of the portable terminal; and
    a position message transmitter for, when an image shot by the shooting means is input, transmitting a message corresponding to the positional information output from the positional information outputting means.

11. The portable terminal claimed in claim 1, wherein the message information storage stores an image which is a characteristic feature of a place where it is difficult for the user to talk on the phone as an image containing the form information.

12. A portable terminal comprising:
    a radio communication means; a message information storage for storing information on different types of messages in association with information on forms which are indicative of locations; a shooting means for shooting an image indicative of a location when a call is received;
    a message information selecting means for recognizing a form that is indicative of a location from the image shot by the shooting means, and selecting a message corresponding to the recognized location from the message information storage;

a message information transmitter for transmitting the message selected by the message information selecting means to a calling source;

a character string information storage for storing character string information in association with time information; and an information extracting means for extracting information indicating a location and/or a situation from the character string information stored in the character string information storage;

wherein the message information transmitter transmits the information extracted by the information extracting means in addition to the message selected by the message information selecting means to the calling source.

13. The portable terminal claimed in claim 12, wherein the information extracting means extracts information corresponding the time of an incoming call from the character string information stored in the character string information storage.

14. A server that communicates with a portable terminal via a communication network, comprising:

a message information storage for storing information on different types of messages in association with information on forms which are indicative of locations;

a message information selecting means for recognizing a form from an image transmitted from the portable terminal which has received an incoming call from a calling source, wherein the form is indicative of a location, and selecting a message corresponding to the recognized location from the message information storage; and a message information transmitter for transmitting the message selected by the message information selecting means to the calling source.

* * * * *

UNITED STATES PATENT AND TRADEMARK OFFICE
CERTIFICATE OF CORRECTION

PATENT NO. : 7,657,252 B2
APPLICATION NO. : 11/105942
DATED : February 2, 2010
INVENTOR(S) : Toshiyuki Futami It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 180 days.

Signed and Sealed this

Thirtieth Day of November, 2010

David J. Kappos
*Director of the United States Patent and Trademark Office*